(12) United States Patent
Wakisaka et al.

(10) Patent No.: US 12,345,555 B2
(45) Date of Patent: Jul. 1, 2025

(54) PHASE MEASURING METHOD AND SIGNAL PROCESSING DEVICE

(71) Applicant: NIPPON TELEGRAPH AND TELEPHONE CORPORATION, Tokyo (JP)

(72) Inventors: Yoshifumi Wakisaka, Musashino (JP); Daisuke Iida, Musashino (JP); Keiji Okamoto, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 834 days.

(21) Appl. No.: 17/595,065

(22) PCT Filed: May 21, 2019

(86) PCT No.: PCT/JP2019/020070
§ 371 (c)(1),
(2) Date: Nov. 8, 2021

(87) PCT Pub. No.: WO2020/234989
PCT Pub. Date: Nov. 26, 2020

(65) Prior Publication Data
US 2022/0221314 A1 Jul. 14, 2022

(51) Int. Cl.
*G01D 5/353* (2006.01)
*G01H 9/00* (2006.01)
(Continued)

(52) U.S. Cl.
CPC ......... *G01D 5/35361* (2013.01); *G01H 9/004* (2013.01)

(58) Field of Classification Search
CPC .......... G01D 5/35361; G01D 5/35358; G01D 5/244; G01H 9/004; G01H 17/00; G01H 15/00
(Continued)

(56) References Cited

U.S. PATENT DOCUMENTS

2009/0103100 A1* 4/2009 Froggatt .............. G01M 11/083
356/477
2014/0255023 A1* 9/2014 Kishida .................. G01H 9/004
398/21
(Continued)

FOREIGN PATENT DOCUMENTS

CA         3124638 A1 *  7/2020  .......... E21B 47/135
WO    WO-2016117044 A1 *  7/2016  ............. G01H 9/002

OTHER PUBLICATIONS

G. Yang et al., "Long-Range Distributed Vibration Sensing Based on Phase Extraction from Phase-Sensitive OTDR", IEEE Photonics Journal, vol. 8, No. 3, 2016.

*Primary Examiner* — Jeffrey P Aiello
(74) *Attorney, Agent, or Firm* — Harness, Dickey & Pierce, P.L.C.

(57) ABSTRACT

A phase measurement method is presented which causes wavelength-multiplexed pulsed light to be incident on a measurement target optical fiber, produces a scattered light vector obtained by plotting scattered light from the measurement target optical fiber for each wavelength onto a two-dimensional plane having the in-phase component thereof on the horizontal axis and the orthogonal component thereof on the vertical axis, rotates the produced scattered light vector for each wavelength at each place in the measurement target optical fiber to align the directions of the vectors, generates a new vector by calculating the arithmetic average of the vectors having the aligned directions, and
(Continued)

calculates the phase by using the values of the in-phase and orthogonal components of the generated new vector.

8 Claims, 15 Drawing Sheets

(51) Int. Cl.
    *G01J 9/00*     (2006.01)
    *G01M 11/00*     (2006.01)
    *G01V 8/16*     (2006.01)

(58) Field of Classification Search
    USPC ......... 73/861.356, 290 V; 356/450; 702/190,
                          702/189, 75, 127, 74, 191, 106, 56
    See application file for complete search history.

(56) References Cited

U.S. PATENT DOCUMENTS

| | | | | |
|---|---|---|---|---|
| 2017/0324474 A1* | 11/2017 | Bravi | ................ | H04B 10/40 |
| 2017/0324476 A1* | 11/2017 | Bravi | ................ | H04J 14/02 |
| 2017/0356793 A1* | 12/2017 | Nishiguchi | ............ | G01H 9/006 |
| 2018/0356210 A1* | 12/2018 | Moore | ................ | G01B 11/18 |
| 2019/0109564 A1* | 4/2019 | Kanter | ................ | H03D 7/165 |

\* cited by examiner

PHASE MEASURING METHOD AND SIGNAL PROCESSING DEVICE

CROSS-REFERENCE TO RELATED APPLICATIONS

This application is a 371 U.S. National Phase of International Application No. PCT/JP2019/020070 filed on May 21, 2019. The entire disclosure of the above application is incorporated herein by reference.

TECHNICAL FIELD

The present disclosure relates to a phase measurement method and a signal processing device that observe temporal change of the phase of scattered light generated at each place in a measurement target optical fiber.

BACKGROUND ART

A method called distributed acoustic sensing (DAS) that causes test pulse light to be incident on a measurement target optical fiber and detects backscattered light due to Rayleigh scattering has been known as a means measuring physical vibration applied to the optical fiber in a distributed manner in the longitudinal direction of the optical fiber.

In DAS, change in the optical path length of the optical fiber due to physical vibration applied to the optical fiber is observed to sense the vibration. It is possible to detect object motion and the like around the measurement target optical fiber by detecting the vibration.

A method of measuring the intensity of scattered light from each place in the measurement target optical fiber and observing temporal change of the scattered light intensity is available as a method of detecting backscattered light in DAS and called DAS-intensity (DAS-I). DAS-I has a characteristic in simple device configuration but cannot quantitatively calculate change in the optical path length of the fiber due to vibration from the scattered light intensity, and thus is qualitative measurement method.

However, DAS-phase (DAS-P) as a method that measures the phase of scattered light from each place in the measurement target optical fiber and observes temporal change of the phase has been researched and developed. The device configuration and signal processing of DAS-P are more complicate than those of DAS-I, but the phase linearly changes with change in the optical path length of the fiber due to vibration, and the rate of the change is identical at each place in the longitudinal direction of the optical fiber, and thus DAS-P can perform quantitative vibration measurement and has a characteristic that DAS-P can precisely reproduce the waveform of vibration applied to the measurement target optical fiber (refer to Non Patent Literature 2, for example).

In measurement by DAS-P, pulse light is incident on the measurement target optical fiber, and the phase of scattered light at time t at which the pulse light is incident is measured in a distributed manner the longitudinal direction of the optical fiber.

Specifically, the phase $\theta(l, t)$ of the scattered light is measured where l represents a distance from an incident end of the optical fiber. As the pulse light is repeatedly incident on the measurement target optical fiber at a time interval T, temporal change $\theta(l, nT)$ of the phase of scattered light at time t=nT where n represents an integer is measured for each point in the longitudinal direction of the measurement target optical fiber. It is known that the size of physical vibration applied in the interval from the distance l to a distance $l+\delta l$ at each time nT is proportional to the difference $\delta \theta(l, nT)$ between the phase $\theta(l+\delta l, nT)$ at the distance $l+\delta l$ and the phase $\theta(l, nT)$ at the distance l. Thus, an expression below is satisfied with a reference at time zero.

[Math. 1]

$$\text{(size of vibration)} \propto \delta\theta(1, nT) - \qquad (1)$$
$$\delta\theta(1, 0) = [\theta(1+\delta 1, nT) - \theta(1, nT)] - [\theta(1+\delta 1, 0) - \theta(1, 0)]$$
$$= [\theta(1+\delta 1, nT) - \theta(1+\delta 1, 0)] - [\theta(1, nT) - \theta(1, 0)]$$

Examples of a device configuration for detecting the phase of scattered light include a direct detection configuration in which backscattered light from the measurement target optical fiber is directly detected by a photodiode or the like, and a configuration using coherent detection in which the backscattered light is detected in combination with separately prepared reference light.

A mechanism that performs coherent detection and calculates the phase is further classified into a mechanism that performs software-based processing by using Hilbert transformation and a mechanism that performs hardware-based processing by using 90-degree optical hybrid, but in both methods, an in-phase component $I(l, nT)$ and an orthogonal component $Q(l, nT)$ of scattered light are acquired, and the phase is calculated by an expression below.

[Math. 2]

$$\theta_{cal}(l, nT) = Arc\tan\left[\frac{Q(l, nT)}{I(l, nT)}\right] \qquad (2)$$

However, an output value from the fourth quadrant arc tangent operator "Arctan" is in a range $(-\pi, \pi]$ in radian, and $2m\pi+\theta(l, nT)$, where m is an arbitrary integer, are all the same vector direction on the xy plane, and thus uncertainty of $2m\pi$ exists in $\theta_{cal}(l, nT)$ calculated as described above.

Thus, signal processing such as phase unwrapping is further performed as a more accurate method of evaluating $\theta(l, nT)$. In typical phase unwrapping, when the phase after unwrapping is represented by

[Math. 2-1]

$$\theta_{cal}^{unwrap} \qquad (2\text{-}1)$$

an appropriate integer q is selected so that when

[Math. 2-2]

$$|\theta_{cal}(l,(p+1)T) - \theta_{cal}^{unwrap}(l,pT)| \qquad (2\text{-}2)$$

is larger than $\pi$ radian where p represents an arbitrary integer,

[Math. 2-3]

$$|\theta_{cal}(l,(p+1)T) + 2\pi q - \theta_{cal}^{unwrap}(l,pT)| \qquad (2\text{-}3)$$

is equal to or smaller than $\pi$ radian, and when the phase after unwrapping is represented by

[Math. 2-4]

$$\theta_{cal}^{unwrap}(l,(p+1)T) \qquad (2\text{-}4)$$

an expression below is calculated.

[Math. 3]

$$\theta_{cal}^{unwrap}(l,(p+1)T) = \theta_{cal}(l,(p+1)T) + 2\pi q \quad (3)$$

is calculated. The upper index "unwrap" indicates the phase after unwrapping.

CITATION LIST

Non-Patent Literature

Non-Patent Literature 1: G. Yang et al., "Long-Range Distributed Vibration Sensing Based on Phase Extraction from Phase-Sensitive OTDR", IEEE Photonics Journal, vol. 8, no. 3, 2016.

SUMMARY OF THE INVENTION

Technical Problem

In measurement by DAS, there are noises of a measuring device, such as heat noise of a PD for detecting light, noise at the subsequent electric stage, and shot noise due to light. Thus, influence of noises of the measuring device appears in the intensity and phase of scattered light to be measured as well.

In particular, when the influence of noises of the measuring device is large in measurement of the phase of scattered light, not only uncertainty of the phase increases, but also the probability of obtaining a measured value largely different from an ideal phase value when there are no noises increases.

For example, in a case of coherent detection, when the in-phase component is taken as the horizontal axis and the orthogonal component is taken as the vertical axis, the direction of the vector of measured scattered light when there is no noise corresponds to a phase to be measured, but when noise influence is large, the direction of the vector points in an opposite direction, and the probability that an actually measured phase value is different from an ideal phase value when there are no noises by $\pi$ radian approximately is high. This leads to false recognition that large physical force is applied to an optical fiber when the size of vibration is calculated from Expression (1). In addition, when noise influence is large, the number of points where the integer q is falsely selected in the unwrapping processing indicated by Expression (3) increases, and a phase value difference equal to or larger than $2\pi$, which does not exist in reality, occurs across a point of false selection. Such a phase value difference also leads to false recognition that large physical force is applied to the optical fiber when the size of vibration is calculated from Expression (1).

To accurately measure the phase, the influence of noises of the measuring device needs to be reduced. The influence of noises of the measuring device is large when it can be regarded that noises of the measuring device are equivalent at each place and each time and when the intensity of scattered light decreases. Thus, the influence of noises of the measuring device can be reduced when the intensity of scattered light can be increased at each place and each time.

Factors of the decrease of the intensity of scattered light are not only losses due to absorption and scattering caused as pulse light propagates through the measurement target optical fiber as a probe. Since pulse light having a finite time width is incident on the measurement target optical fiber and scattering of the pulse light is detected, interference occurs with scattered light from a large number of scattering bodies extremely finely distributed in the measurement target optical fiber. As a result of the interference, the intensity of the scattered light decreases at places in accordance with distribution of the scattering bodies in the longitudinal direction of the measurement target optical fiber at each time. This phenomenon is called fading (refer to Non Patent Literature 1, for example).

Thus, when the phase of scattered light in DAS-P is to be measured, the occurrences of places where the intensity of the scattered light decreases at each time due to fading need to be prevented to reduce the influence of noises of the measuring device.

This problem can be solved by a method of simply increasing the peak intensity of incident light pulse. However, when the peak intensity is increased, a non-linear effect occurs, and characteristics of the pulse light change with propagation through the measurement target optical fiber. Thus, the peak intensity of a light pulse that can be incident is limited, and the above-described problem cannot be sufficiently solved in some cases.

Thus, the present invention is intended to solve the above-described problem by providing a phase measurement method and a signal processing device that are capable of reducing influence of noise of a measuring device without increasing the peak intensity of an incident light pulse when measuring the phase of scattered light in DAS-P.

Means for Solving the Problem

To achieve the above-described intention, a phase measurement method and a signal processing device according to the present invention causes wavelength-multiplexed light pulse to be incident on a measurement target optical fiber, produces a scattered light vector obtained by plotting scattered light from the measurement target optical fiber in each wavelength onto a two-dimensional plane having the in-phase component thereof as the horizontal axis and the orthogonal component thereof as the vertical axis, rotates the produced scattered light vector for each wavelength at each place in the measurement target optical fiber to align the directions of the vectors, generates a new vector by calculating the arithmetic average of the vectors having the aligned directions, and calculates the phase by using the values of the in-phase and orthogonal components of the generated new vector. In this case, when the light pulse is multiplexed in N wavelengths, the phase calculation is performed by using only p wavelengths of highest scattered light intensities.

Specifically, a first phase measurement method according to the present invention includes a measurement procedure of emitting a light pulse obtained by multiplexing N (N is an integer equal to or larger than two) wavelengths into a measurement target optical fiber and measuring an in-phase component and an orthogonal component of scattered light generated at the light pulse; a selection procedure of sorting rays of the scattered light measured through the measurement procedure in descending order of light intensity, the rays corresponding to the respective wavelengths, and selecting a predetermined number p (p is an integer between 1 and N inclusive) rays of the scattered light having the highest light intensities; a vector acquisition procedure of acquiring, for each of the p wavelengths selected through the selection procedure, a two-dimensional vector constituted by an in-phase component and an orthogonal component at an arbitrary time and an arbitrary position in the measurement target optical fiber among the in-phase and orthogonal components of the scattered light; a vector rotation procedure of rotating the two-dimensional vector acquired through the vector acquisition procedure for each wavelength at a reference time by a reference rotational amount for the wavelength so that the two-dimensional vector becomes aligned with a reference direction, and rotating the two-dimensional vector acquired through the vector acquisition procedure for each wavelength at other time different from the reference time by a reference rotational amount for the wavelength; and a calculation procedure of calculating a synthesis reference vector as an arithmetic average of the two-dimensional vector for each wavelength at the reference time, which is rotated through the vector rotation procedure, calculating a synthesis vector as an arithmetic average of the two-dimensional vector for each wavelength at the other time, which is rotated through the vector rotation procedure, and calculating a phase change amount of the scattered light based on an angle between the synthesis reference vector and the synthesis vector.

A first signal processing device according to the present invention includes: an input unit which is input an in-phase component and an orthogonal component of scattered light generated at a wavelength-multiplexed light pulse which is obtained by multiplexing N (N is an integer equal to or larger than two) wavelengths and incident on a measurement target optical fiber are input, the in-phase and orthogonal components being measured by a measuring device; a selection circuit sorts rays of the scattered light input to the input unit in descending order of light intensity, the rays corresponding to respective wavelengths, and select a predetermined number p (p is an integer between 1 and N inclusive) rays of the scattered light having the highest light intensities; a vector acquisition circuit acquires, for each of the p wavelengths selected by the selection circuit, a two-dimensional vector constituted by an in-phase component and an orthogonal component at an arbitrary time and an arbitrary position in the measurement target optical fiber among the in-phase and orthogonal components of the scattered light input to the input unit; a vector rotation circuit rotates the two-dimensional vector acquired by the vector acquisition circuit for each wavelength at a reference time by a reference rotational amount for the wavelength so that the two-dimensional vector becomes aligned with a reference direction, and rotates the two-dimensional vector acquired by the vector acquisition circuit for each wavelength at other time different from the reference time by a reference rotational amount for the wavelength; and a calculation circuit calculates a synthesis reference vector as an arithmetic average of the two-dimensional vector for each wavelength at the reference time, which is rotated by the vector rotation circuit, calculates a synthesis vector as an arithmetic average of the two-dimensional vector for each wavelength at the other time, which is rotated by the vector rotation circuit, and calculates a phase change amount of the scattered light based on an angle between the synthesis reference vector and the synthesis vector.

The first phase measurement method and the first signal processing device according to the present invention perform phase calculation by using a two-dimensional vector constituted by the in-phase component and the orthogonal component of scattered light due to incident light pulses of N different wavelengths. The phase measurement method and the signal processing device according to the present invention utilize that the rotational amount of the two-dimensional vector with time (in other words, vibration) is same irrespective of the wavelength. All two-dimensional vectors at a reference time are aligned in a reference direction (each two-dimensional vector is rotated by a reference rotational amount for the wavelength), and the arithmetic average thereof is calculated as a synthesis reference vector. Then, all two-dimensional vectors at other time are each rotated by a reference rotational amount for the wavelength, and the arithmetic average thereof is calculated as a synthesis vector. The amount of phase change of the scattered light occurred between the reference time and the other time is calculated based on the angle between the synthesis reference vector and the synthesis vector. In this manner, the arithmetic average of two-dimensional vectors of all wavelengths is used to reduce influence due to fading.

A second phase measurement method according to the present invention includes: a measurement procedure of emitting a light pulse obtained by multiplexing N (N is an integer equal to or larger than two) wavelengths into a measurement target optical fiber and measuring an in-phase component and an orthogonal component of scattered light generated at the light pulse; a selection procedure of sorting rays of the scattered light measured through the measurement procedure in descending order of light intensity, the rays corresponding to the respective wavelengths, and selecting a predetermined number p (p is an integer between 1 and N inclusive) rays of the scattered light having the highest light intensities; a vector acquisition procedure of acquiring, for each of the p wavelengths selected through the selection procedure, a two-dimensional vector constituted by an in-phase component and an orthogonal component at an arbitrary time and an arbitrary position in the measurement target optical fiber among the in-phase and orthogonal components of the scattered light; a first vector rotation procedure of rotating the two-dimensional vector acquired through the vector acquisition procedure for a reference wavelength at each time by a reference rotational amount for the time so that the two-dimensional vector becomes aligned with a reference direction, and rotating the two-dimensional vector acquired through the vector acquisition procedure for other wavelength different from the reference wavelength at each time by the reference rotational amount for the time; a first calculation procedure of calculating a first synthesis reference vector as an arithmetic average of the two-dimensional vector for the reference wavelength at each time, which is rotated through the first vector rotation procedure, calculating a first synthesis vector for each wavelength as an arithmetic average of the two-dimensional vector rotated through the first vector rotation procedure for the other wavelength at each time, and calculating a reference rotational amount for each wavelength based on an angle between the first synthesis reference vector and the first synthesis vector; a second vector rotation procedure of rotating the two-dimensional vector acquired through the vector acquisition procedure for each wavelength at a reference time by the reference rotational amount for the wavelength, which is calculated through the first calculation procedure, and rotating the two-dimensional vector acquired through the vector acquisition procedure for each wavelength at other time different from the reference time by the reference rotational amount for the wavelength, which is calculated through the first calculation procedure; and a second calculation procedure of calculating a second synthesis reference vector as an arithmetic average of the two-dimensional vector for each wavelength at the reference time, which is rotated through the second vector rotation procedure, calculating a second synthesis vector as an arithmetic average of the two-dimensional vector for each wavelength at the other time, which is rotated through the second vector rotation procedure, and calculating a phase change amount of the scattered light based on an angle between the second synthesis reference vector and the second synthesis vector.

A second signal processing device according to the present invention includes: an input unit which is input an in-phase component and an orthogonal component of scattered light generated at a wavelength-multiplexed light pulse which is obtained by multiplexing N (N is an integer equal to or larger than two) wavelengths and is incident on a measurement target optical fiber are input, the in-phase and orthogonal components being measured by a measuring device; a selection circuit sorts rays of the scattered light input to the input unit in descending order of light intensity, the rays corresponding to respective wavelengths, and selects a predetermined number p (p is an integer between 1 and N inclusive) rays of the scattered light having the highest light intensities; a vector acquisition circuit acquires, for each of the p wavelengths selected by the selection circuit, a two-dimensional vector constituted by an in-phase component and an orthogonal component at an arbitrary time and an arbitrary position in the measurement target optical fiber among the in-phase and orthogonal components of the scattered light input to the input unit; a first vector rotation circuit rotates the two-dimensional vector acquired by the vector acquisition circuit for a reference wavelength at each time by a reference rotational amount for the time so that the two-dimensional vector becomes aligned with a reference direction, and rotates the two-dimensional vector acquired by the vector acquisition circuit for other wavelength different from the reference wavelength at each time by the reference rotational amount for the time; a first calculation circuit calculates a first synthesis reference vector as an arithmetic average of the two-dimensional vector for the reference wavelength at each time, which is rotated by the first vector rotation circuit, calculates a first synthesis vector for each wavelength as an arithmetic average of the two-dimensional vector for the other wavelength at each time, which is rotated by the first vector rotation circuit, and calculates a reference rotational amount for each wavelength based on an angle between the first synthesis reference vector and the first synthesis vector; a second vector rotation circuit rotates the two-dimensional vector acquired by the vector acquisition circuit for each wavelength at a reference time by a reference rotational amount for the wavelength, which is calculated by the first calculation circuit, and rotates the two-dimensional vector acquired by the vector acquisition circuit for each wavelength at other time different from the reference time by a reference rotational amount for the wavelength, which is calculated by the first calculation circuit; and a second calculation circuit calculates a second synthesis reference vector an arithmetic average of the two-dimensional vector for each wavelength at the reference time, which is rotated by the second vector rotation circuit, calculates a second synthesis vector as an arithmetic average of the two-dimensional vector for each wavelength at the other time, which is rotated by the second vector rotation circuit, and calculates a phase change amount of the scattered light based on an angle between the second synthesis reference vector and the second synthesis vector.

The second phase measurement method and the second signal processing device according to the present invention first determine a rotation angle at each time so that a measurement vector for a reference wavelength at the time points a reference direction (for example, an I axis), and rotates a vector for other wavelength at each time by the rotation angle. Then, the angle of a time average vector obtained by calculating, for each wavelength, a time average of the rotated vector at each time is used as a vector rotation angle for the wavelength, which is described for the first phase measurement method and the first signal processing device. Influence of noises can be further reduced.

The present invention does not perform the phase calculation by using all wavelengths multiplexed in a light pulse but performs the phase calculation by using p wavelengths of high scattered light intensities. When the value of p is constant irrespective of the position in an optical fiber and time, it is only needed to sort the wavelengths based on the scattered light intensity, and thus no uncertainty calculation is needed, and calculation time is reduced. Then, when the value of p is set for the value of N as described above, the phase calculation can be performed as a statistical average over all places at an uncertainty substantially equivalent to the smallest uncertainty of a phase calculation method to be described later.

Thus, the present invention can provide a phase measurement method and a signal processing device that are capable of reducing influence of noise of a measuring device without increasing the peak intensity of an incident light pulse when measuring the phase of scattered light in DAS-P.

The predetermined number p may be determined as follows.

Distribution D(Pi) of intensity Pi of the scattered light of a wavelength i at an arbitrary time and an arbitrary position in the measurement target optical fiber, and a noise level Noise at acquisition of the two-dimensional vector constituted by an in-phase component and an orthogonal component of the scattered light is measured, X (X is an arbitrary positive integer) lengths |r(x, i)| (x=1, . . . , X) of the two-dimensional vector of the scattered light of the wavelength i are randomly generated by a calculator so that a squared value of each length |r(x, i)| obeys the distribution D(Pi), the lengths |r(x, i)| are sorted in descending order, an average value |r'(x, p')| of the longest p' lengths |r(x, i)| is calculated, a phase detection sensitivity of each average value |r'(x, p')| that satisfies Math. B1 by using Math. B2 is calculated, an average value ε(p') of the phase detection sensitivities is compared with an arbitrary reference sensitivity ε, and the predetermined number p is set to be a minimum p' that satisfies ε≥ε(p').

[Math. B1]

$$|r'(x, p')| > \frac{\text{Noise}}{\sqrt{p'}} \tag{B1}$$

[Math. B2]

$$Arc\sin\left(\frac{\text{Noise}}{\sqrt{p'} \, |r'(x, p')|}\right) \tag{B2}$$

A third phase measurement method according to the present invention includes: a measurement procedure of emitting a light pulse obtained by multiplexing N (N is an integer equal to or larger than two) wavelengths into a measurement target optical fiber and measuring an in-phase component and an orthogonal component of scattered light generated at the light pulse; a first detection procedure of sorting rays of the scattered light measured through the measurement procedure in descending order of light intensity, the rays corresponding to the respective wavelengths, calculating an uncertainty D(n) of a phase of Math. C1 by using n (n is an integer between 1 and N inclusive) rays of the scattered light having the highest light intensities, and detecting n that minimizes the uncertainty D(n) of the phase; a vector acquisition procedure of acquiring, for each of the n wavelengths detected through the first detection procedure, a two-dimensional vector constituted by an in-phase component and an orthogonal component at an arbitrary time and an arbitrary position in the measurement target optical fiber among the in-phase and orthogonal components of the scattered light; a second detection procedure of calculating a value H of Math. C2 for each of the n wavelengths detected through the first detection procedure, sorting rays of the scattered light in ascending order of the value H, the rays corresponding to times, calculating an uncertainty Dt(M) of a phase of Math. C3 by using rays of the scattered light having the smallest values H up to an M-th time, and detecting M that minimizes the uncertainty Dt(M) of the phase; a first vector rotation procedure of rotating the two-dimensional vector acquired through the vector acquisition procedure for a reference wavelength at each of M times by a reference rotational amount for the time so that the two-dimensional vector becomes aligned with a reference direction, and rotating the two-dimensional vector acquired through the vector acquisition procedure for other wavelength different from the reference wavelength at each of M times by the reference rotational amount for the time; a first calculation procedure of calculating a first synthesis reference vector as an arithmetic average of the two-dimensional vector for the reference wavelength at each time, which is rotated through the first vector rotation procedure, calculating a first synthesis vector for each wavelength as an arithmetic average of the two-dimensional vector for the other wavelength at each time, which is rotated through the first vector rotation procedure, and calculating a reference rotational amount for each wavelength based on an angle between the first synthesis reference vector and the first synthesis vector; a second vector rotation procedure of rotating the two-dimensional vector acquired through the vector acquisition procedure for each wavelength at a reference time by the reference rotational amount for the wavelength, which is calculated through the first calculation procedure, and rotating the two-dimensional vector acquired through the vector acquisition procedure for each wavelength at other time different from the reference time by the reference rotational amount for the wavelength, which is calculated through the first calculation procedure; and a second calculation procedure of calculating a second synthesis reference vector as an arithmetic average of the two-dimensional vector for each wavelength at the reference time, which is rotated through the second vector rotation procedure, calculating a second synthesis vector as an arithmetic average of the two-dimensional vector for each wavelength at the other time, which is rotated through the second vector rotation procedure, and calculating a phase change amount of the scattered light based on an angle between the second synthesis reference vector and the second synthesis vector.

[Math. C1]

$$D(n) = Arc\sin\left(\frac{Noise}{\sqrt{n}\,|r(n)|}\right) \quad (C1)$$

where |r(n)| is an average value of a length of a vector constituted by the in-phase and orthogonal components of each of n rays of the scattered light having highest light intensities among rays of the scattered light measured through the measurement procedure and sorted in descending order of light intensity, the rays corresponding to the respective wavelengths, and Noise is a noise level of measurement of the scattered light in the measurement procedure.

[Math. C2]

$$H = \frac{1}{P_k^2} + \frac{1}{P_l^2} \quad (C2)$$

where $P_k$ is a light intensity of the scattered light of a wavelength k, and $P_l$ is a light intensity of the scattered light of a wavelength 1.

[Math. C3]

$$Dt(M) = Arc\sin\left(\frac{Noise}{\sqrt{M}\,|r(M)|}\right) \quad (C3)$$

where |r(M)| is an average value of a length of a vector constituted by the in-phase and orthogonal components of each of the M rays of the scattered light sorted in ascending order of the value H in the second detection procedure.

A third signal processing device according to the present invention includes: an input unit which is input an in-phase component and an orthogonal component of scattered light generated at a wavelength-multiplexed light pulse obtained by multiplexing N (N is an integer equal to or larger than two) wavelengths and incident on a measurement target optical fiber are input, the in-phase and orthogonal components being measured by a measuring device; a first detection circuit sorts rays of the scattered light input to the input unit in descending order of light intensity, the rays corresponding to respective wavelengths, calculate an uncertainty D(n) of a phase of Math. C1 by using n (n is an integer between 1 and N inclusive) rays of the scattered light having the highest light intensities, and detects n that minimizes the uncertainty D(n) of the phase; a vector acquisition circuit acquires, for each of the n wavelengths detected by the first detection circuit, a two-dimensional vector constituted by an in-phase component and an orthogonal component at an arbitrary time and an arbitrary position in the measurement target optical fiber among the in-phase and orthogonal components of the scattered light input to the input unit; a second detection circuit calculates a value H of Math. C2 for each of the n wavelengths detected by the first detection circuit, sorts rays of the scattered light in ascending order of the value H, the rays corresponding to times, calculates an uncertainty Dt(M) of a phase of Math. C3 by using rays of the scattered light having the smallest values H up to an M-th time, and detects M that minimizes the uncertainty Dt(M) of the phase; a first vector rotation circuit rotates the two-dimensional vector acquired by the vector acquisition circuit for a reference wavelength at each of M times by a reference rotational amount for the time so that the two-dimensional vector becomes aligned with a reference direction, and rotates the two-dimensional vector acquired by the vector acquisition circuit for other wavelength different from the reference wavelength at each of M times by the reference rotational amount for the time; a first calculation circuit calculates a first synthesis reference vector as an arithmetic average of the two-dimensional vector for the reference wavelength at each time, which is rotated by the first vector rotation circuit, calculates a first synthesis vector for each wavelength as an arithmetic average of the two-dimensional vector for the other wavelength at each time, which is rotated by the first vector rotation circuit, and calculates a reference rotational amount for each wavelength based on an angle between the first synthesis reference vector and the first synthesis vector; a second vector rotation circuit rotates the two-dimensional vector acquired by the vector acquisition circuit for each wavelength at a reference time by a reference rotational amount for the wavelength, which is calculated by the first calculation circuit, and rotates the two-dimensional vector acquired by the vector acquisition circuit for each wavelength at other time different from the reference time by a reference rotational amount for the wavelength, which is calculated by the first calculation circuit; and a second calculation circuit calculates a second synthesis reference vector an arithmetic average of the two-dimensional vector for each wavelength at the reference time, which is rotated by the second vector rotation circuit, calculates a second synthesis vector as an arithmetic average of the two-dimensional vector for each wavelength at the other time, which is rotated by the second vector rotation circuit, and calculates a phase change amount of the scattered light based on an angle between the second synthesis reference vector and the second synthesis vector.

The phase change amount is calculated by the third phase measurement method (device) when the phase calculation is desired to be performed at a smaller uncertainty at a place or a time in the phase change amount calculated by the first or second phase measurement method (device). The present phase calculation method has characteristics in the method of calculating the arithmetic average of two-dimensional vectors. The present phase calculation method does not use the order of the wavelengths of a wavelength-multiplexed light pulse, but sorts rays of scattered light of the respective wavelengths in descending order of light intensity and calculates phase uncertainty with wavelengths of n highest light intensities. This process is sequentially performed from the scattered light ray n=1 of the maximum light intensity to the scattered light ray n=N of the minimum light intensity, thereby searching for the minimum value of the uncertainty D(n). The phase change amount is calculated by using scattered light rays up to the n-th scattered light ray that provides the minimum value of D(n). The phase change amount can be calculated at a reduced uncertainty by the third phase measurement method.

Advantageous Effects of Invention

The present invention can provide a phase measurement method and a signal processing device that are capable of reducing influence of noise of a measuring device without increasing the peak intensity of an incident light pulse when measuring the phase of scattered light in DAS-P.

The third phase measurement method (device) can perform measurement at a sensitivity higher than those of the first and second phase measurement methods (devices) with the same number of multiplexed wavelengths, and thus can detect minute vibration. In other words, a predetermined measurement sensitivity can be obtained with a smaller number of multiplexed wavelengths by the third phase measurement method (device), which can lead to, for example, simplification of a device configuration and the like and cost reduction. Moreover, phase calculation at a place of interest can be swiftly performed when the first or second phase measurement method is performed before the third phase measurement method.

DESCRIPTION OF EMBODIMENTS

Embodiments of the present invention will be described below with reference to the accompanying drawings. The embodiments described below are examples of the present invention, and the present invention is not limited to the embodiments below. Components having the same reference sign in the present specification and drawings are identical to each other.

Embodiment 1

Figure 1:
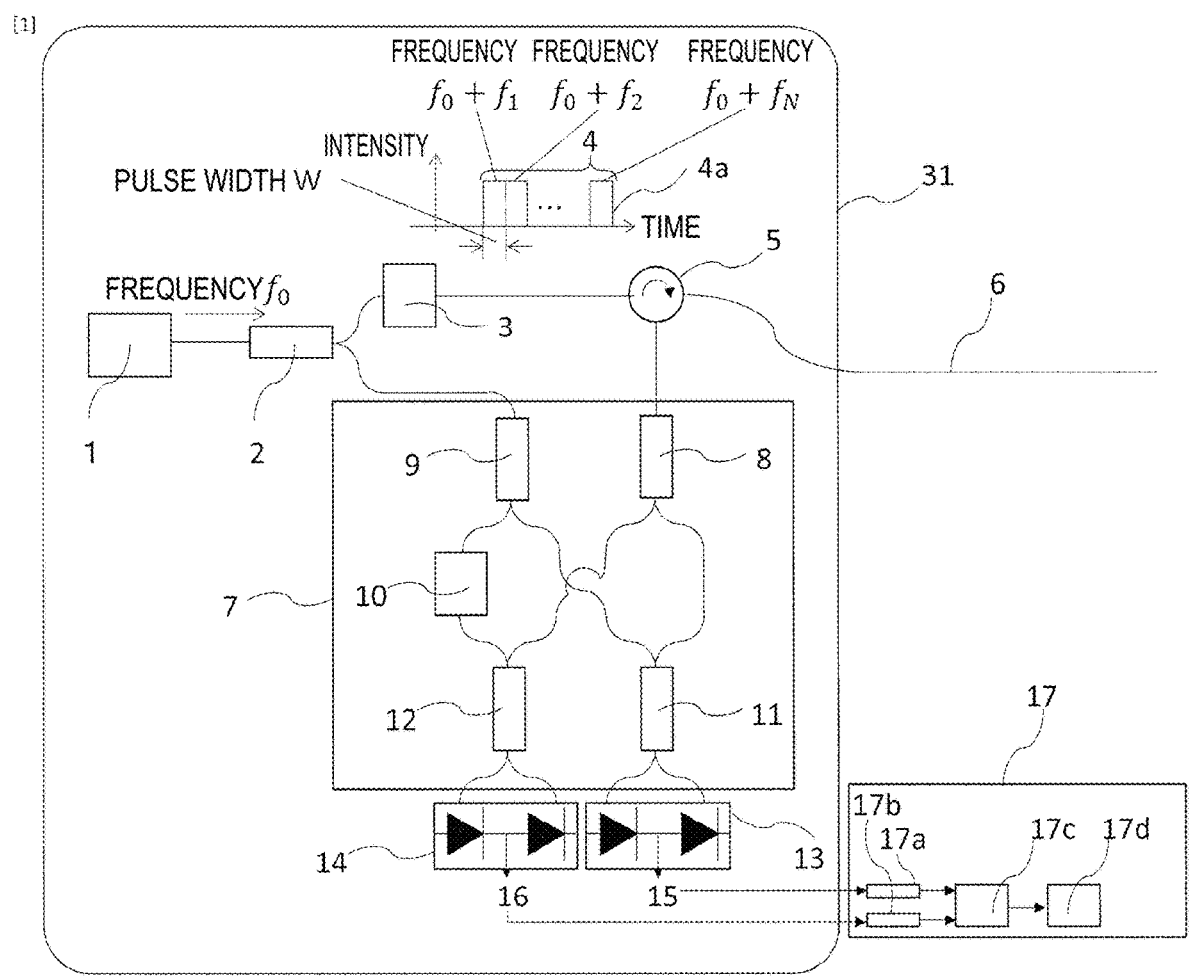
FIG. 1 is a diagram for description of a vibration detection device including a signal processing device according to the present invention.

FIG. 1 is a diagram for description of a vibration detection device of the present embodiment configured to perform vibration detection in DAS-P. The vibration detection device includes a measuring device 31 configured to perform coherent detection by using 90-degree optical hybrid in a reception system, and a signal processing device 17.

The measuring device 31 measures scattered light from a measurement target optical fiber 6 as follows. Continuous light having a frequency $f_0$ and a single wavelength is emitted from a CW light source 1 and bifurcated into reference light and probe light by a coupler 2. The probe light is shaped into a wavelength-multiplexed light pulse such as a light pulse 4 by a light modulator 3. The light pulse 4 has a configuration in which minute pulses 4a each having a frequency $f_0+f_i$ (i is an integer) and a pulse width set to a value W corresponding to the spatial resolution of measurement in the optical-fiber longitudinal direction are arranged for i=1, 2, . . . , N (N is an integer). The frequencies $f_i$ are selected to be sufficiently separated so that it can be regarded that the intensity of scattered light at each time and each place has no correlation between the values of i different from each other.

The kind of the light modulator 3 is not specifically specified as long as the light modulator 3 is capable of generating the light pulse 4, and the number thereof may be two or more. For example, a SSB modulator or a frequency-variable AO modulator may be used as the light modulator 3, and further intensity modulation by SOA or the like may be performed to increase the extinction ratio in pulsing.

The light pulse 4 is incident on the measurement target optical fiber 6 through a circulator 5. Light scattered at each point in an optical fiber 6 in the longitudinal direction returns to the circulator 5 as backscattered light and is incident on one input unit of a 90-degree optical hybrid 7. The reference light bifurcated by the coupler 2 is incident on the other input unit of the 90-degree optical hybrid 7.

The 90-degree optical hybrid 7 may have any internal configuration having a 90-degree optical hybrid function. An exemplary configuration thereof is illustrated in FIG. 1. The backscattered light is incident on a coupler 8 having a bifurcation ratio of 50:50, and two bifurcated rays of the scattered light are incident on an input unit of a coupler 12 having a bifurcation ratio of 50:50 and an input unit of a coupler 11 having a bifurcation ratio of 50:50. The reference light is incident on a coupler 9 having a bifurcation ratio of 50:50, and one of two bifurcated rays of the reference light is incident on the input unit of the coupler 11, whereas the other bifurcated ray is incident on the input unit of the coupler 12 with the phase shifted by $\pi/2$ at a phase shifter 10.

Two outputs from the coupler 11 are detected by a balance detector 13, and an electric signal 15 as an analog in-phase component $I^{analog}$ is output. Two outputs from the coupler 12 are detected by a balance detector 14, and an electric signal 16 as an analog orthogonal component $Q^{analog}$ is output.

The electric signal 15 and the electric signal 16 are transferred to the signal processing device 17 including an AD conversion function element 17a and an AD conversion function element 17b capable of performing sampling of a signal frequency band without aliasing. At the signal processing device 17, for a signal of an in-phase component $I^{digital}$ and an orthogonal component $Q^{digital}$ digitized and output from the AD conversion function element 17a and the AD conversion function element 17b, a signal of scattered light due to each pulse included in the light pulse 4 and having the frequency $f_0+f_i$ (i=1, 2, . . . , N) is separated by a signal processing unit 17c.

Specifically, the signal processing unit 17c separates an in-phase component $I_i^{measure}$ and an orthogonal component $Q_i^{measure}$ obtained when a pulse of each frequency $f_0+f_i$ component is incident alone, by performing signal processing on $I^{digital}$ as superposition of in-phase components for all i and $Q^{digital}$ as superposition of orthogonal components for all i. Any specific signal processing method may be used as long as $I_i^{measure}$ and $Q_i^{measure}$ can be accurately separated from $I^{digital}$ and $Q_i^{digital}$. For example, a method that calculates $I_i^{measure}$ and $Q_i^{measure}$ by subjecting $I^{digital}$ and $Q^{digital}$ to a digital band-pass filter having a central frequency of $f_0+f_i$ and a passband of 2/W and ensuring phase delay is applicable.

In the method, an in-phase component and an orthogonal component as analog electric signals are digitized through AD conversion, and then separation into each frequency component is performed, but for example, an in-phase component and an orthogonal component as analog electric signals may be separated into each frequency component through an analog electric filter and then subjected to AD conversion.

Figure 2:
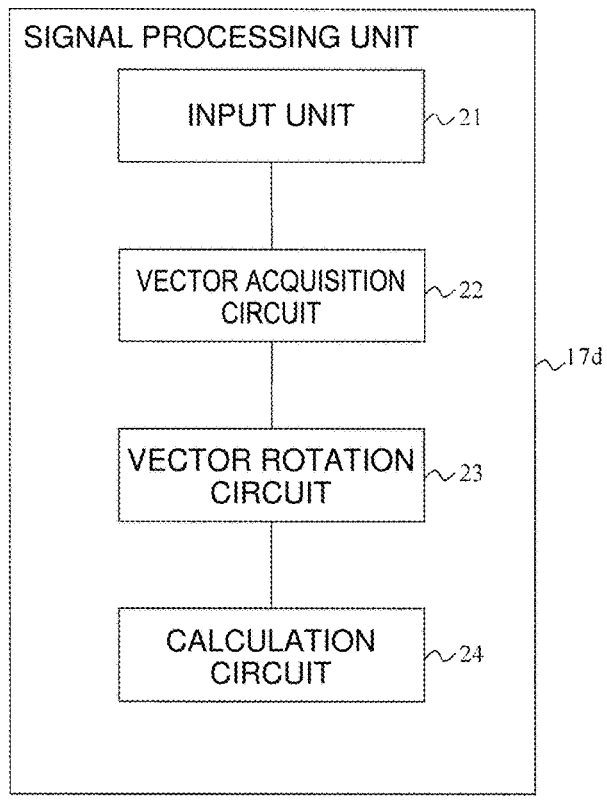
FIG. 2 is a diagram for description of the structure of the signal processing device according to the present invention.

Phase calculation is performed at a signal processing unit 17d based on $I_i^{measure}$ and $Q_i^{measure}$ acquired by the signal processing unit 17c. FIG. 2 is a diagram for description of the structure of the signal processing unit 17d. The signal processing unit 17d includes: an input unit 21 to which the in-phase and orthogonal components of scattered light generated at the wavelength-multiplexed light pulse 4 incident on the measurement target optical fiber 6 are input, the in-phase and orthogonal components being measured by the measuring device 31; a vector acquisition circuit 22 configured to acquire, for each wavelength multiplexed in the light pulse 4, a two-dimensional vector constituted by the in-phase and orthogonal components at an arbitrary time and an arbitrary position in the measurement target optical fiber 6 among the in-phase and orthogonal components of the scattered light input to the input unit 21; a vector rotation circuit 23 configured to rotate the two-dimensional vector acquired by the vector acquisition circuit 22 for each wavelength at a reference time by a reference rotational amount for the wavelength so that the two-dimensional vector becomes aligned with a reference direction, and rotate the two-dimensional vector acquired by the vector acquisition circuit 22 for each wavelength at another time different from the reference time by a reference rotational amount for the wavelength; and a calculation circuit 24 configured to calculate a synthesis reference vector as the arithmetic average of the two-dimensional vector for each wavelength at the reference time, which is rotated by the vector rotation circuit 23, calculate a synthesis vector as the arithmetic average of the two-dimensional vector for each wavelength at the other time, which is rotated by the vector rotation circuit 23, and calculate the phase change amount of the scattered light based on the angle between the synthesis reference vector and the synthesis vector.

Figure 3:
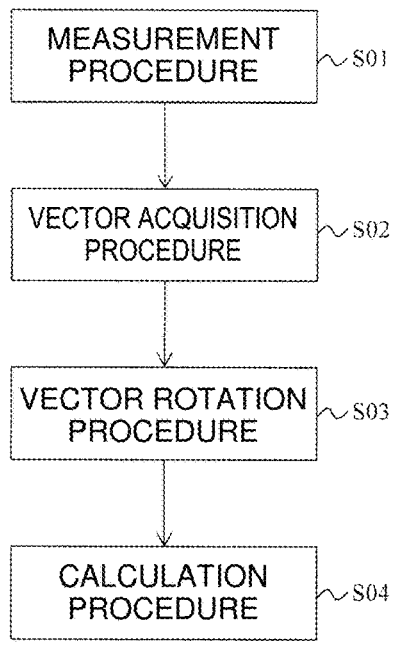
FIG. 3 is a diagram for description of a phase measurement method according to the present invention.

FIG. 3 is a diagram for description of a phase measurement method performed by the present vibration detection device. The phase measurement method includes: a measurement procedure S01 of measuring the in-phase and orthogonal components of scattered light generated at the wavelength-multiplexed light pulse 4 incident on the measurement target optical fiber 6; a vector acquisition procedure S02 of acquiring, for each wavelength multiplexed in the light pulse 4, a two-dimensional vector constituted by the in-phase and orthogonal components at an arbitrary time and an arbitrary position in the measurement target optical fiber 6 among the in-phase and orthogonal components of the scattered light measured through the measurement procedure S01; a vector rotation procedure S03 of rotating the two-dimensional vector acquired through the vector acquisition procedure S02 for each wavelength at a reference time by a reference rotational amount for the wavelength so that the two-dimensional vector becomes aligned with a reference direction, and rotating the two-dimensional vector acquired through the vector acquisition procedure S02 for each wavelength at another time different from the reference time by a reference rotational amount for the wavelength; and a calculation procedure S04 of calculating a synthesis reference vector as the arithmetic average of the two-dimensional vector for each wavelength at the reference time, which is rotated through the vector rotation procedure S03, calculating a synthesis vector as the arithmetic average of the two-dimensional vector for each wavelength at the other time, which is rotated through the vector rotation procedure S03, and calculating the phase change amount of the scattered light based on the angle between the synthesis reference vector and the synthesis vector.

The following first describes a method of calculating a phase by using the in-phase component $I_i^{measure}$ and the orthogonal component $Q_i^{measure}$ only at a single frequency, and then describes influence of fading at phase calculation.

$I_i^{measure}(l, nT)$ is a measured value in which noise is added to an in-phase component $I_i(l, nT)$ when there is no noise, and $Q_i^{measure}(l, nT)$ is a measured value in which noise is added to an orthogonal component $Q_i(l, nT)$ when there is no noise. Thus, when $N_I$ and $N_Q$ represent noises superimposed on the in-phase component and the orthogonal component, respectively, the measured values can be expressed by expressions below.

[Math. 4]

$$I_i^{measure}(l,nT) = I_i(l,nT) + N_I(l,nT) \quad (4)$$

[Math. 5]

$$Q_i^{measure}(l,nT) = Q_i(l,nT) + N_Q(l,nT) \quad (5)$$

The phase is calculated from the measured in-phase and orthogonal components by the signal processing device 17 as follows.

[Math. 6]

$$\theta_i^{cal}(l, nT) = Arctan\left[\frac{Q_i^{measure}(l, nT)}{I_i^{measure}(l, nT)}\right] = Arctan\left[\frac{Q_i(l, nT) + N_Q(l, nT)}{I_i(l, nT) + N_I(l, nT)}\right] \quad (6)$$

Since there are the noises $N_I$ and $N_Q$, uncertainty occurs to a position pointed by a vector $(x, y) = (I_i^{measure}(l, nT), Q_i^{measure}(l, nT))$ on an xy plane with the in-phase component as the x axis and the orthogonal component as the y axis, and uncertainty also occurs to the phase as a direction pointed by the vector. For example, when there are no noises, a phase calculated value $\theta_i^{cal}(l, nT)$ does not temporally change for each l but is a constant value while no vibration is applied to the optical fiber. However, when there are noises, the phase calculated value $\theta_i^{cal}(l, nT)$ temporally changes for each l even while no vibration is applied to the optical fiber.

Figure 4:
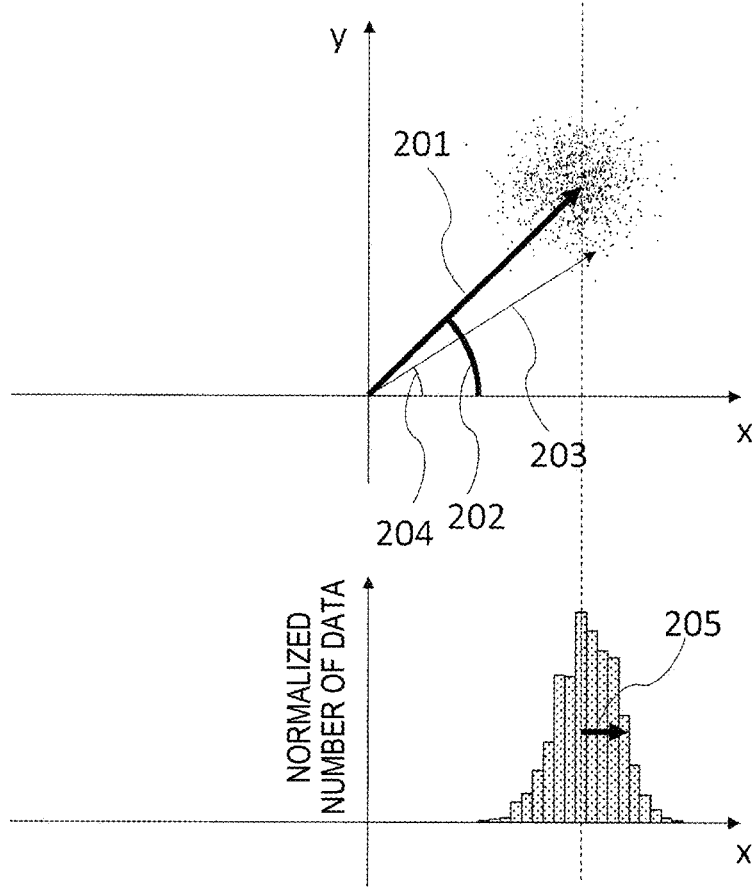
FIG. 4 is a diagram for description of uncertainty of a position pointed by a vector due to noise.

FIG. 4 is a diagram illustrating this situation. When plotted on the xy plane, a vector $(I_i^{measure}(l_0, nT), Q_i^{measure}(l_0, nT))$ at a position $l_0$ is constant at $(x, y) = (I_i(l, nT), Q_i(l, nT))$ indicated by a vector 201 in a case in which there are no noises, and an angle 202 thereof does not temporally change. However, since noises exist in reality, the vector constituted by the in-phase component and the orthogonal component at each time like a vector 203 is different from the vector 201, and an angle 204 thereof is different from the angle 202. Thus, the vector constituted by the actual measured values has variance with a center at the vector 201. The degree of the variance can be evaluated by using standard deviation of the measured value in each axial direction. For example, in the x axial direction, there is uncertainty of the standard deviation $\sigma(N_I)$ of the noise $N_I$, which is indicated by reference sign 205, based on variance of the measured-value x component.

In a case of coherent detection, the intensity of the reference light is sufficiently large, and thus shot noise is dominant, and noise distribution can be approximated by normal distribution. In addition, since it can be regarded that the intensities of light incident on the two balance detectors 13 and 14 in FIG. 1 are equivalent to each other, it can be regarded that the standard deviations of the noises $N_I$ and $N_Q$ have the same magnitude, and the uncertainty has a circular shape centered at the vector 201.

For example, in a case of a device configuration that performs direct detection instead of coherent detection and for which a noise, such as PD heat noise, other than shot noise of the reference light cannot be ignored, it can be regarded that the two balance detectors 13 and 14 have the same noise characteristic. Thus, in the case of the above-described device configuration as well, it can be thought that the uncertainty has a circular centered at the vector 201.

However, in such a device configuration that performs direct detection, the degree of the uncertainty is different at each place, depending on the scattered light intensity, for example, when shot noise of scattered light needs to be considered. Noise of the measuring device following an electric stage, such as PD heat noise, is dominant in the uncertainty at a point where the scattered light intensity is small, and thus influence of a fading phenomenon described below exists for the device configuration that performs direct detection.

The scattered light intensity decreases at places due to the fading phenomenon. The uncertainty in phase calculation increases at such a place, and it is difficult to detect small vibration. In particular, when the amplitude of scattered light when there is no noise is small as indicated by a vector 206 in FIG. 5 so that the SN ratio is smaller than one, the probability that a measured vector has, as indicated by a vector 207, a value largely different from the value of the vector 206 when there is no noise increases, which leads to false sensing of vibration. For this reason, when the subsequent unwrapping processing expressed by Expression (3) is performed, the probability that the integer q is wrongly selected increases, which leads to false sensing that particularly large vibration is applied.

It is known that distribution D(P) of variance of scattered light intensity P due to fading when experiment is performed with a single wavelength satisfies an equation below when <P> represents the average value of the scattered light intensity.

[Math. 7]

$$D(P) \propto \exp\left[-\frac{P}{<P>}\right] \quad (7)$$

As indicated by the expression, the distribution D(P) of variance of the scattered light intensity P is larger as the scattered light intensity P is smaller. Thus, when the number of points where the scattered light intensity is small is reduced by increasing the intensity of a pulse of a single wavelength, an extremely large peak intensity is needed, and thus there is limitation in terms of pulse distortion such as a non-linear effect.

Thus, as described below, the signal processing unit 17d performs phase calculation by using the in-phase component $I_i^{measure}$ and the orthogonal component $Q_i^{measure}$ at N different frequencies for i=1, 2, . . . , N, thereby preventing increase of phase uncertainty at a point where the scattered light intensity is small due to fading.

[Measurement Procedure S01]

The in-phase component and the orthogonal component of scattered light generated at the wavelength-multiplexed light pulse 4 incident on the measurement target optical fiber 6 is measured by using a measurement system described with reference to FIG. 1.

[Vector Acquisition Procedure S02]

The two-dimensional vector constituted by the in-phase component and the orthogonal component of the scattered light measured through the measurement procedure S01 at an arbitrary time and an arbitrary position in the measurement target optical fiber 6 is acquired for each wavelength multiplexed in the light pulse 4.

[The Vector Rotation Procedure S03]

First, the phase $\theta_i^{cal}(l, 0)$ is calculated from the measured-value vector $(I_i^{measure}(l, 0), Q_i^{measure}(l, 0))$ at time zero. Subsequently, the vector $(I_i^{measure}(l, nT), Q_i^{measure}(l, nT))$ at each time is rotated by a rotational amount in a direction opposite to that of the calculated phase value $\theta_i^{cal}(l, 0)$, thereby calculating a new vector at each time and each place as in Expression (8).

[Math. 8]

$$\begin{pmatrix} I_i^{new}(l, nT) \\ Q_i^{new}(l, nT) \end{pmatrix} = \begin{pmatrix} \cos(\theta_i^{cal}(l, 0)) & \sin(\theta_i^{cal}(l, 0)) \\ -\sin(\theta_i^{cal}(l, 0)) & \cos(\theta_i^{cal}(l, 0)) \end{pmatrix} \begin{pmatrix} I_i^{measure}(l, nT) \\ Q_i^{measure}(l, nT) \end{pmatrix} \quad (8)$$

[Calculation Procedure S04]

Then, the arithmetic average of the newly calculated vector for each wavelength is calculated as in Expression (9), thereby calculating a vector directly used in phase calculation.

[Math. 9]

$$\begin{pmatrix} I^{new}(l, nT) \\ Q^{new}(l, nT) \end{pmatrix} = \frac{1}{N} \sum_{i=1}^{N} \begin{pmatrix} I_i^{new}(l, nT) \\ Q_i^{new}(l, nT) \end{pmatrix} \quad (9)$$

Lastly, a phase $\theta^{cal}(l, nT)$ is calculated from the vector $(I^{new}(l, nT), Q^{new}(l, nT))$ as in Expression (10).

[Math. 10]

$$\theta^{cal}(l, nT) = Arc\tan\left(\frac{Q^{new}(l, nT)}{I^{new}(l, nT)}\right) \quad (10)$$

It is possible to reduce the number of places where the scattered light intensity decreases due to fading by calculating $\theta^{cal}(l, nT)$ by using the vector $(I^{new}(l, nT), Q^{new}(l, nT))$. The principle thereof will be described below.

Figure 6:
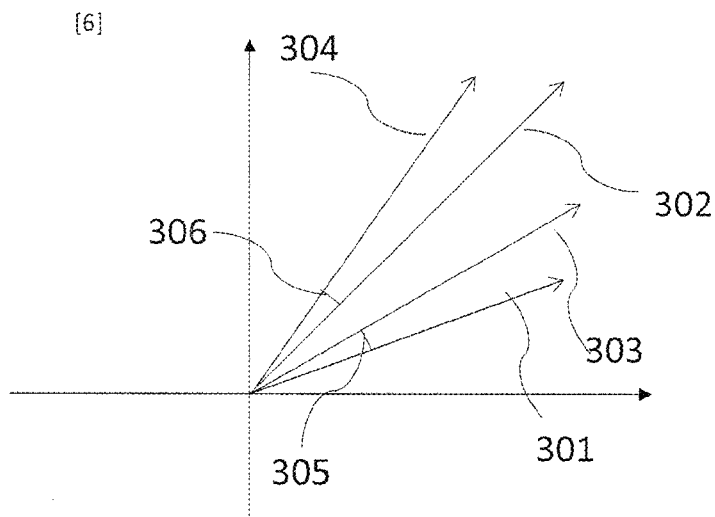
FIG. 6 is a diagram for description of the principle of the phase measurement method according to the present invention.

The values of $\theta_i^{cal}(l, nT)$ at N different frequencies for i=1, 2, . . . , N are different from one another. For example, in a case of N=2, the vectors $(I_i(l, 0), Q_i(l, 0))$ for i=1 and i=2 at time zero when there are no noises have different directions and magnitudes like a vector 301 and a vector 302 in FIG. 6. When the net expansion and contraction amount of the fiber at a place closer than a place at a distance l from an incident end at time nT changes from that at time zero due to vibration, the vectors $(I_i(l, nT), Q_i(l, nT))$ for i=1 and i=2 at time nT change like a vector 303 and a vector 304 in FIG. 6 respectively. The lengths of the vector 303 and the vector 304 change from those of the vector 301 and the vector 302, respectively, and the amount of the change is different between i=1 and i=2, but the directions of the vector 303 and the vector 304 change by the same amount from those of the vector 301 and the vector 302, respectively.

Figure 7:
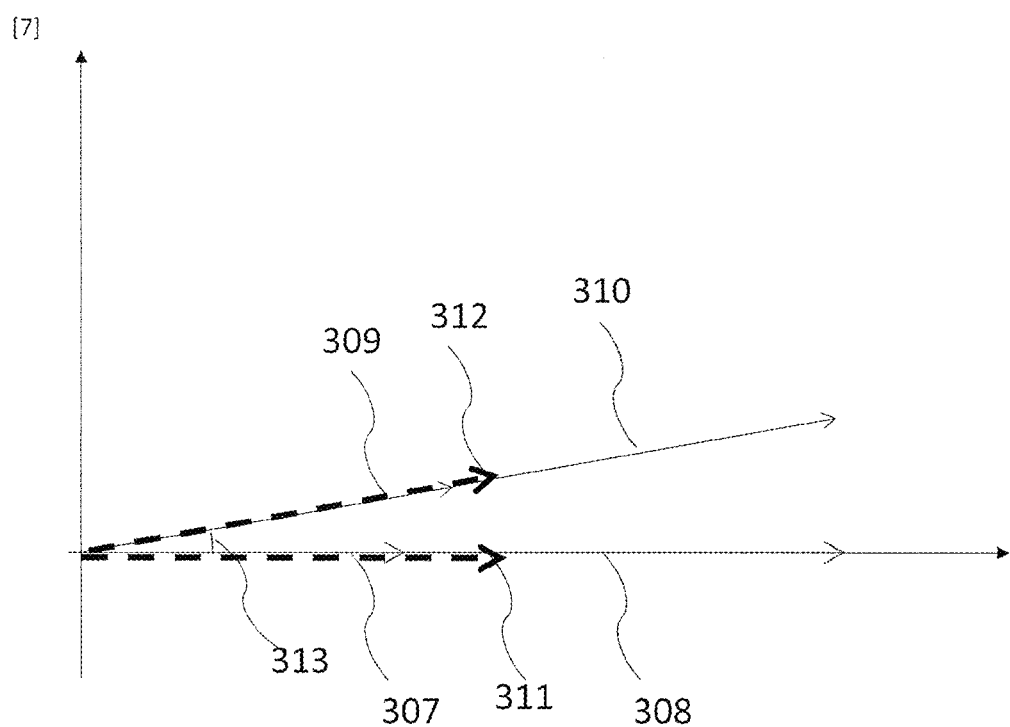
FIG. 7 is a diagram for description of the principle of the phase measurement method according to the present invention.

Thus, an angle 305 and an angle 306 are equal to each other, and this amount corresponds to $\theta(l, nT)$ in Expression (1). When there are no noises, the vector 301, the vector 302, the vector 303, and the vector 304 are transitioned to a vector 307, a vector 308, a vector 309, and a vector 310, respectively, as illustrated in FIG. 7 by Expression (8). In this manner, the directions of vectors of all wavelengths are aligned for each time.

A vector 311 $(I^{new}(l, 0), Q^{new}(l, 0))$ is obtained as the average of the vector 307 and the vector 308, and a vector 312 $(I^{new}(l, nT), Q^{new}(l, nT))$ is obtained as the average of the vector 309 and the vector 310. The change amount of the phase from time 0 to nT is an angle 313, which is equal to the angle 305 and the angle 306.

In actual measurement, uncertainty due to noises exists in the directions of the vector 301, the vector 302, the vector 303, the vector 304, the vector 311, and the vector 312, and as a result, the angle 305 and the angle 306 have uncertainty. However, it is possible to reduce uncertainty by calculating the angle 313 by using the vector 311 and the vector 312 obtained through arithmetic averaging. There are two reasons for this.

Figure 8:
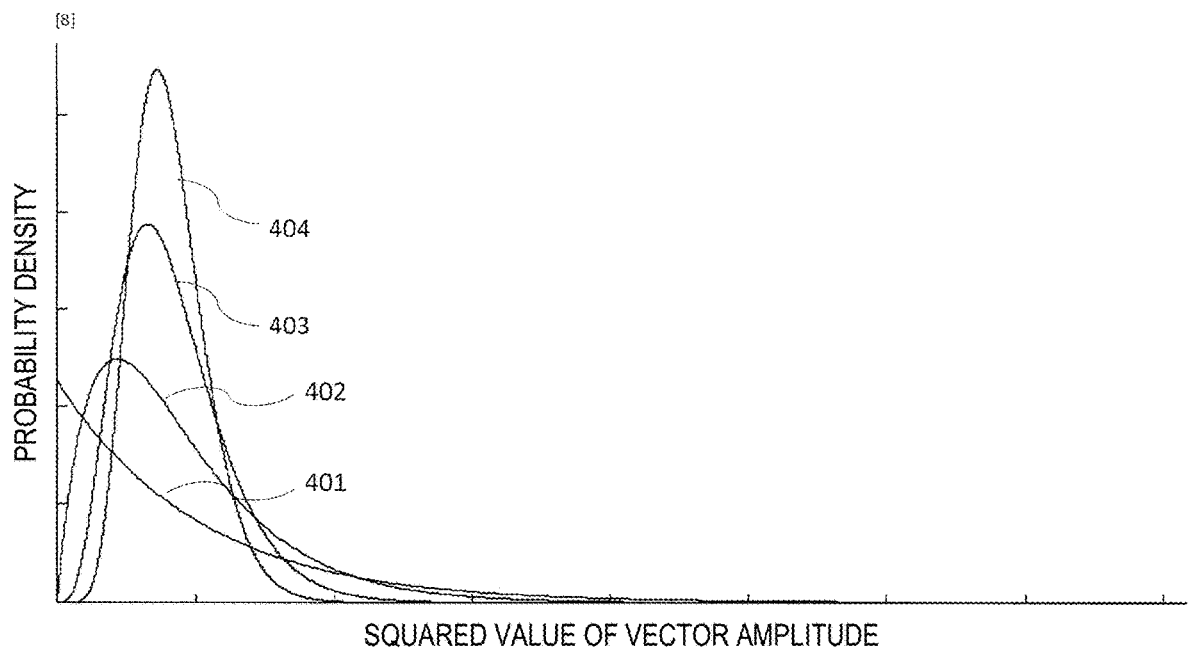
FIG. 8 is a diagram for description of an effect of the phase measurement method according to the present invention.

One reason is because intensity probability distribution corresponding to the squared amplitude of each of the vector 307 and the vector 308 independently obeys Expression (7). Thus, intensity probability distribution corresponding to the squared amplitude of the vector 311 is theoretically distribution 402 in FIG. 8, and it is possible to remove a point where the scattered light intensity significantly decreases due to fading in a case of a single wavelength, with the same average value. For comparison, FIG. 8 illustrates, as distribution 401, probability distribution in a case of one wavelength.

The other reason is because, through averaging of the vector 307 and the vector 308, the vector 311 obtains a noise level equal to $1/\sqrt{2}$ of those of the vector 301 and the vector 302. Thus, although the average value of the length of the vector 311 is same as those of the vector 301 and the vector 302, it is possible to decrease uncertainty in phase calculation through the decrease of the noise level. This is same for the vector 312.

The effect of the present disclosure is specifically described above for the case of N frequencies where N is two, but generalization thereof is possible. The number of places where the scattered light intensity is close to zero decreases for a larger multiplex number N. This situation in a case of N=5 is indicated as distribution 403, and the situation in a case of N=10 is indicated as distribution 404. In addition, the magnitude of the noise level is $1/\sqrt{N}$ times larger, and thus uncertainty in phase calculation decreases for a larger N with the same average intensity.

The signal processing method described in the present embodiment is different from a method of simply averaging $\theta_i^{cal}(l, nT)$ over different values of i, for example, a method of calculating the average of a phase 305 and a phase 306 in a case of N=2. In the method of simply averaging $\theta_i^{cal}(l, nT)$ over differently values of i, since $\theta_i^{cal}(l, nT)$ is calculated for a single wavelength, the measured value is largely different at a place where the scattered light intensity is small due to fading as compared to a case in which there are no noises. Thus, the occurrences of vibration false sensing cannot be reduced. Although it is possible to reduce, through phase averaging, the difference between an ideal phase value when there are no noises and the measured value, the occurrence frequency of the difference increases because a place where the scattered light intensity decreases is different for each wavelength. Thus, a point where the scattered light intensity decreases due to fading cannot be removed by simply averaging $\theta_i^{cal}(l, nT)$ over different values of i.

Although the right hand side of Expression (9) includes multiplication by 1/N for description, the phase value calculated by Expression (10) is same without the multiplication, and thus the multiplication by 1/N may be omitted in actual calculation.

Embodiment 2

Embodiment 1 describes an example in which the rotation angle of the vector rotation of Expression (8) is $\theta_i^{cal}(l, 0)$ at time zero. An in-phase component and an orthogonal component used to calculate $\theta_i^{cal}(l, 0)$ are $(I_i^{measure}(l, 0), Q_i^{measure}(l, 0))$ constituting a vector including noise influence. Thus, $\theta_i^{cal}(l, 0)$ includes noise influence. The effect of the vector rotation of Expression (8) is potentially not obtained in a case in which, at time zero, the value of $\theta_i^{cal}(l, 0)$ is largely different from the value of θi (l, 0) when there are no noises.

Figure 5:
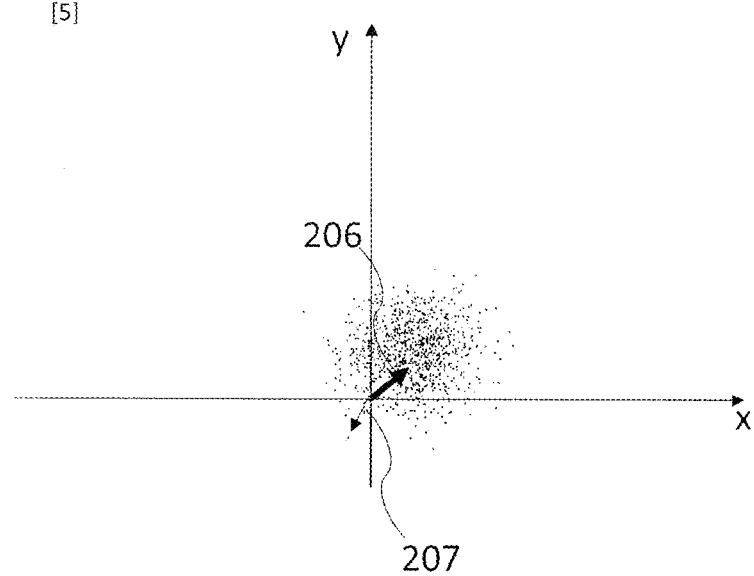
FIG. 5 is a diagram for description of vector difference due to the existence of noises.

Description is made with reference to FIG. 5. For example, at a place in the fiber longitudinal direction and at a frequency, the vector of scattered light at time zero, which is the vector 206 when there are no noises, is the vector 207 due to noises. Calculation that performs vector rotation by Expression (8) and then vector arithmetic averaging by Expression (9) has an effect of reducing the number of points (points affected by fading) where the vector length is close to zero. However, in this example, the rotation angle at the frequency is determined with reference to the angle of the vector 207, and thus the effect cannot be obtained for the frequency.

In addition, an error in the rotation angle also leads to a case in which the size of measured vibration cannot be correctly evaluated. This case is described with reference to FIG. 6. For example, when the vectors 301 and 303 (wavelength 1) and the vectors 302 and 304 (wavelength 2) are vectors not affected by noises, a rotation angle that aligns vectors having different wavelengths is not zero. However, when the directions of a vector of wavelength 1 and a vector of wavelength 2 are incidentally identical to each other due to the influence of noises at time zero as a reference, the vector of wavelength 2 at zero rotation angle, in other words, with no rotation is subjected to arithmetic averaging with the vector of wavelength 1 in the method of Embodiment 1. Specifically, the average vector at time zero is a vector obtained through arithmetic averaging of the vectors 301 and the vector 302 (no rotation), and the average vector at time nT is a vector obtained through arithmetic averaging the vectors 303 and the vector 304 (no rotation). Thus, average-vector angle change from time zero to time nT does not match angle change from the vector 301 to the vector 303 nor angle change from the vector 302 to the vector 304, and phase change cannot be correctly determined.

The present embodiment describes a method of reducing the occurrence frequency of failure as described above.

Figure 9:
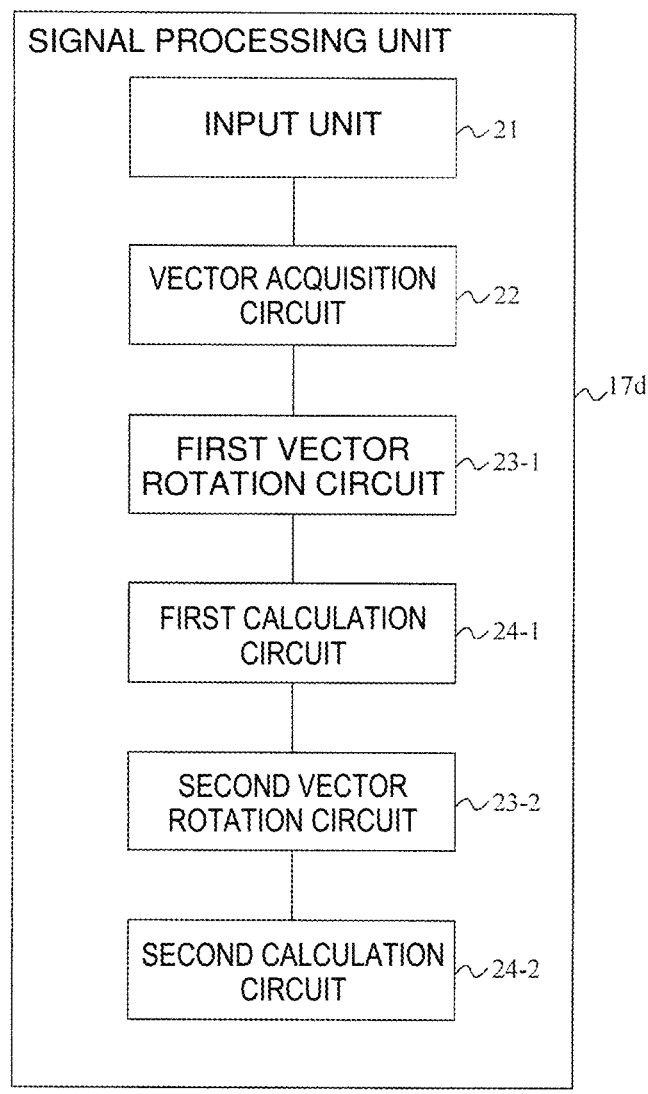
FIG. 9 is a diagram for description of the structure of the signal processing device according to the present invention.

FIG. 9 is a diagram for description of the structure of the signal processing unit 17d of a vibration detection device of the present embodiment. The signal processing unit 17d of the present embodiment includes: the input unit 21 to which the in-phase and orthogonal components of scattered light generated at a wavelength-multiplexed light pulse incident on a measurement target optical fiber are input, the in-phase and orthogonal components being measured by a measuring device; the vector acquisition circuit 22 configured to acquire, for each wavelength multiplexed in the light pulse, a two-dimensional vector constituted by the in-phase and orthogonal components at an arbitrary time and an arbitrary position in the measurement target optical fiber 6 among the in-phase and orthogonal components of the scattered light input to the input unit 21; a first vector rotation circuit 23-1 configured to rotate the two-dimensional vector acquired by the vector acquisition circuit 22 for a reference wavelength at each time by a reference rotational amount for the time so that the two-dimensional vector becomes aligned with a reference direction, and rotate the two-dimensional vector acquired by the vector acquisition circuit 22 for another wavelength different from the reference wavelength at each time by the reference rotational amount for the time; a first calculation circuit 24-1 configured to calculate a first synthesis reference vector as the arithmetic average of the two-dimensional vector for the reference wavelength at each time, which is rotated by the first vector rotation circuit 23-1, calculate a first synthesis vector for each wavelength as the arithmetic average of the two-dimensional vector for the other wavelength at each time, which is rotated by the first vector rotation circuit 23-1, and calculate a reference rotational amount for each wavelength based on the angle between the first synthesis reference vector and the first synthesis vector; a second vector rotation circuit 23-2 configured to rotate the two-dimensional vector acquired by the vector acquisition circuit 22 for each wavelength at a reference time by the reference rotational amount for the wavelength, which is calculated by the first calculation circuit 24-1, and rotate the two-dimensional vector acquired by the vector acquisition circuit 22 for each wavelength at another time different from the reference time by the reference rotational amount for the wavelength, which is calculated by the first calculation circuit 24-1; and a second calculation circuit 24-2 configured to calculate a second synthesis reference vector as the arithmetic average of the two-dimensional vector for each wavelength at the reference time, which is rotated by the second vector rotation circuit 23-2, calculate a second synthesis vector as the arithmetic average of the two-dimensional vector for each wavelength at the other time, which is rotated by the second vector rotation circuit 23-2, and calculate the phase change amount of the scattered light based on the angle between the second synthesis reference vector and the second synthesis vector.

Figure 10:
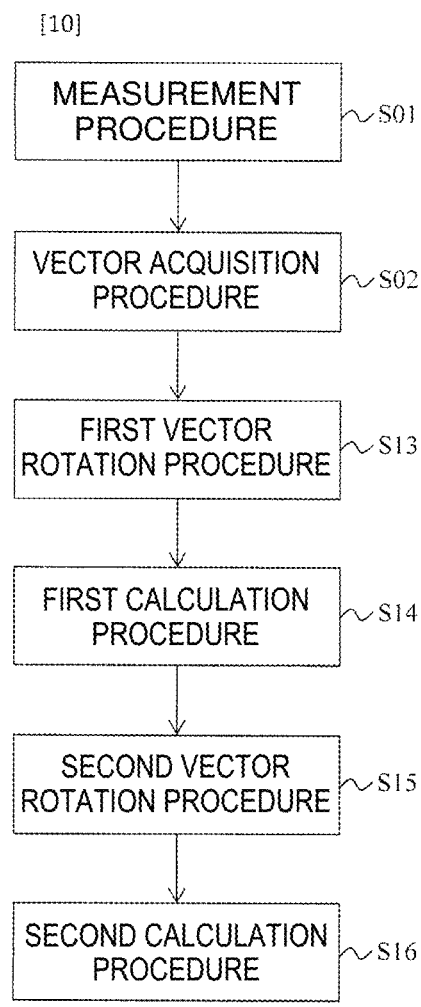
FIG. 10 is a diagram for description of the phase measurement method according to the present invention.

FIG. 10 is a diagram for description of the phase measurement method performed by the present vibration detection device. The phase measurement method includes: the measurement procedure S01 of measuring the in-phase and orthogonal components of scattered light generated at a wavelength-multiplexed light pulse incident on a measurement target optical fiber; the vector acquisition procedure S02 of acquiring, for each wavelength multiplexed in the light pulse, a two-dimensional vector constituted by an in-phase component and an orthogonal component at an arbitrary time and an arbitrary position in the measurement target optical fiber among the in-phase and orthogonal components of the scattered light, the in-phase and orthogonal components being measured through the measurement procedure S01; a first vector rotation procedure S13 of rotating the two-dimensional vector acquired through the vector acquisition procedure S02 for a reference wavelength at each time by a reference rotational amount for the time so that the two-dimensional vector becomes aligned with a reference direction, and rotating the two-dimensional vector acquired through the vector acquisition procedure S02 for another wavelength different from the reference wavelength at each time by the reference rotational amount for the time; a first calculation procedure S14 of calculating the first synthesis reference vector as the arithmetic average of the two-dimensional vector for the reference wavelength at each time, which is rotated through the first vector rotation procedure S13, calculating the first synthesis vector for each wavelength as the arithmetic average of the two-dimensional vector for the other wavelength at each time, which is rotated through the first vector rotation procedure S13, and calculating a reference rotational amount for each wavelength based on the angle between the first synthesis reference vector and the first synthesis vector; a second vector rotation procedure S15 of rotating the two-dimensional vector acquired through the vector acquisition procedure S02 for each wavelength at a reference time by the reference rotational amount for the wavelength, which is calculated through the first calculation procedure S14, and rotating the two-dimensional vector acquired through the vector acquisition procedure S02 for each wavelength at another time different from the reference time by the reference rotational amount for the wavelength, which is calculated through the first calculation procedure S14; and a second calculation procedure S16 of calculating the second synthesis reference vector as the arithmetic average of the two-dimensional vector for each wavelength at the reference time, which is rotated through the second vector rotation procedure S15, calculating the second synthesis vector as the arithmetic average of the two-dimensional vector for each wavelength at the other time, which is rotated through the second vector rotation procedure S15, and calculating the phase change amount of the scattered light based on the angle between the second synthesis reference vector and the second synthesis vector.

The input unit 21, the vector acquisition circuit 22, the measurement procedure S01, and the vector acquisition procedure S02 are same as described in Embodiment 1.

First, the first vector rotation circuit 23-1 performs the first vector rotation procedure S13 below.

The first vector rotation circuit 23-1 calculates an expression below for all values of i with i=1 as a reference (reference wavelength).

[Math. 11]

$$r'_i(l, nT) = \begin{pmatrix} I'_i(l, nT) \\ Q'_i(l, nT) \end{pmatrix} = \begin{pmatrix} \cos(\theta_1^{cal}(l, nT)) & \sin(\theta_1^{cal}(l, nT)) \\ -\sin(\theta_1^{cal}(l, nT)) & \cos(\theta_1^{cal}(l, nT)) \end{pmatrix} \begin{pmatrix} I_i^{measure}(l, nT) \\ Q_i^{measure}(l, nT) \end{pmatrix} \quad (11)$$

Subsequently, a first calculation circuit 23-1 performs the first calculation procedure S14 below. The first calculation circuit 23-1 calculates arithmetic average of r'(l, nT) obtained by Expression (11) for all times by an expression below.

[Math. 12]

$$r''_i(l) = \begin{pmatrix} I''_i(l) \\ Q''_i(l) \end{pmatrix} = \frac{1}{M} \sum_{n=1}^{M} r'_i(l, nT) \quad (12)$$

In the expression, M represents the number of samples in the time direction. An expression below is calculated by using $r_i''(l)$ obtained by Expression (12).

[Math. 13]

$$\theta'_i(l) = \text{Arctan}\left[\frac{Q''_i(l)}{I''_i(l)}\right] \quad (13)$$

Simple description is given below.

First, the vector at each time is rotated for the reference wavelength i=1 so that the vector points along an I axis. This rotation angle is represented by $\theta_{i=1}(t)$. The angle $\theta_{i=1}(t)$ changes with time. The vector after the rotation is represented by At.

Subsequently, the vector at each time is rotated by $\theta_{i=1}(t)$ for another wavelength. The vector for each wavelength after the rotation is represented by $Bt_i$.

Subsequently, the vectors after the rotation are averaged in time for each wavelength. The vector for the reference wavelength after the time average is represented by $\Sigma At$. The vector for the other wavelength after the time average is represented by $\Sigma Bt_i$.

Then, the angle between $\Sigma At$ and $\Sigma Bt_i$ is calculated. This angle is θI'(l) in Expression (13). The angle θI'(l) exists for each other wavelength.

The second vector rotation procedure S15 performed by the second vector rotation circuit 23-2 and the second calculation procedure S16 performed by the second calculation circuit 24-2 are same as the vector rotation procedure S03 and the calculation procedure S04, respectively, described in Embodiment 1 except for points described below. In calculation of Expression (8), the vector ($I^{new}(l, nT)$, $Q^{new}(l, nT)$) is calculated by using $\theta_i'(l)$ in Expression (13) in place of $\theta_i^{cal}(l, 0)$, and phase calculation is performed by Expression (9).

Significance of the present method is described below. When vibration occurs, the angle between vectors of different frequencies does not change in a case in which there are no noises. In an example of two frequencies, without noise influence, the angle between the vectors 301 and the vector 302 at a reference time is equal to the angle between the vectors 303 and the vector 304 at time nT after. Thus, the vector rotation by Expression (11) is performed and then the vector arithmetic averaging by Expression (12) is performed to obtain a rotation angle $\theta_i'(l)$ as the angle between the arithmetic average vector at the reference time and the arithmetic average vector at time nT after. Accordingly, the size of noise included in each vector can be reduced to $1/\sqrt{M}$. Thus, noise influence can be reduced by setting a sufficiently large M.

The method of the present embodiment is different from a method (hereinafter referred to as a comparative method) of calculating a rotation angle by calculating the phase difference between vectors of different frequencies for each time and then averaging the phase difference between for all times. The method of the present embodiment is different in that vectors of all wavelengths are rotated by a rotation angle of wavelength 1 in advance. For example, when the number of frequencies is two, the comparative method simply calculates the angle difference between the vectors 302 and the vector 301 and the angle difference between the vectors 303 and the vector 302 and calculates a rotation angle as the average value thereof. With the comparative method, the effect of the rotation by Expression (8) is insufficient because the occurrence probability of a point (measurement position in the measurement target fiber) where the calculated value of the phase difference at each time is largely different from that when there are no noises does not change.

Although the right hand side of Expression (12) includes multiplication by 1/M for description, the rotation angle calculated by Expression (13) is same without the multiplication, and thus the multiplication by 1/M may be omitted in actual calculation.

The method of Embodiment 2 has an increased calculation time but has reduced uncertainty in definitive phase calculation as compared to the method of Embodiment 1.

Embodiment 3

Figure 11:
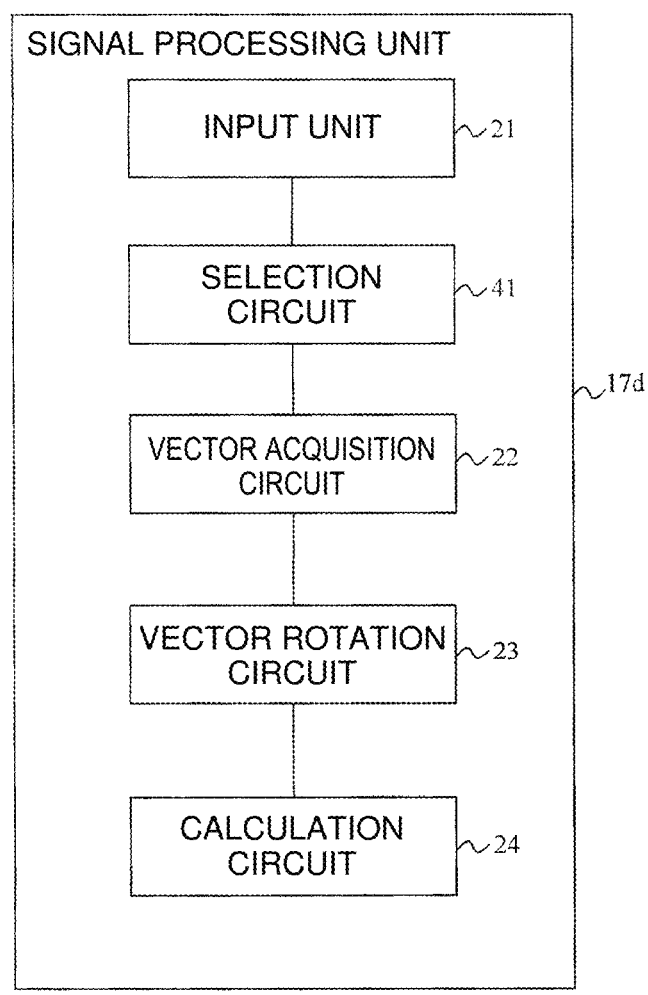
FIG. 11 is a diagram for description of the structure of the signal processing device according to the present invention.

The configuration of a vibration detection device of the present embodiment is same as the configuration of the vibration detection device in FIG. 1. FIG. 11 is a diagram for description of the structure of the signal processing unit 17d of the present embodiment.

The signal processing unit 17d is the first signal processing device and includes: the input unit 21 to which the in-phase and orthogonal components of scattered light generated at a wavelength-multiplexed light pulse obtained by multiplexing N (N is an integer equal to or larger than two) wavelengths and incident on the measurement target optical fiber 6 are input, the in-phase and orthogonal components being measured by the measuring device 31; a selection circuit 41 configured to select a predetermined number p (p is an integer between 1 and N inclusive) of rays of the scattered light having the highest light intensities from among rays of the scattered light input to the input unit 21 and sorted in descending order of light intensity, the rays corresponding to the respective wavelengths; the vector acquisition circuit 22 configured to acquire, for each of the p wavelengths selected by the selection circuit 41, a two-dimensional vector constituted by an in-phase component and an orthogonal component at an arbitrary time and an arbitrary position in the measurement target optical fiber 6 among the in-phase and orthogonal components of the scattered light input to the input unit 21; the vector rotation circuit 23 configured to rotate the two-dimensional vector acquired by the vector acquisition circuit 22 for each wavelength at a reference time by a reference rotational amount for the wavelength so that the two-dimensional vector becomes aligned with a reference direction, and rotate the two-dimensional vector acquired by the vector acquisition circuit 22 for each wavelength at another time different from the reference time by a reference rotational amount for the wavelength; and the calculation circuit 24 configured to calculate a synthesis reference vector as the arithmetic average of the two-dimensional vector for each wavelength at the reference time, which is rotated by the vector rotation circuit 23, calculate a synthesis vector as the arithmetic average of the two-dimensional vector for each wavelength at the other time, which is rotated by the vector rotation circuit 23, and calculate the phase change amount of the scattered light based on the angle between the synthesis reference vector and the synthesis vector.

Figure 12:
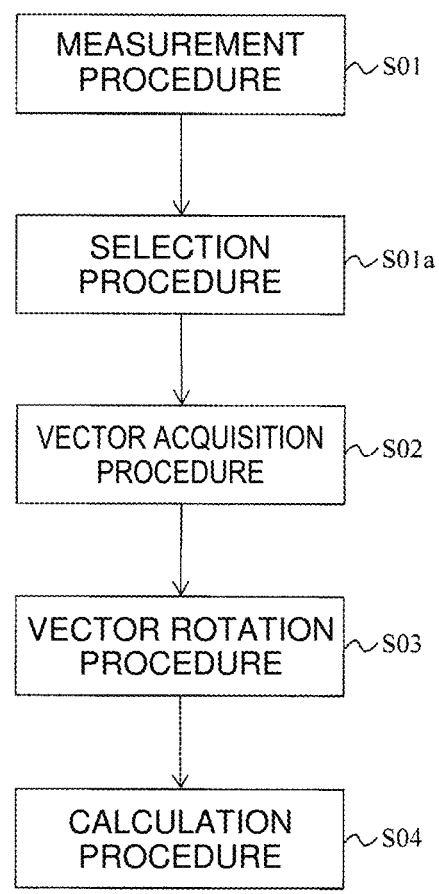
FIG. 12 is a diagram for description of the phase measurement method according to the present invention.

FIG. 12 is a diagram for description of the phase measurement method performed by the present vibration detection device. The phase measurement method is the first phase measurement method and includes: the measurement procedure S01 of emitting a light pulse obtained by multiplexing N wavelengths into the measurement target optical fiber 6 and measuring the in-phase and orthogonal components of scattered light generated at the light pulse; a selection procedure S01a of sorting rays of the scattered light measured through the measurement procedure S01 in descending order of light intensity, the rays corresponding to the respective wavelengths, and selecting a predetermined number p (p is an integer between 1 and N inclusive) of rays of the scattered light having the highest light intensities; the vector acquisition procedure S02 of acquiring, for each of the p wavelengths selected through the selection procedure S01a, a two-dimensional vector constituted by an in-phase component and an orthogonal component at an arbitrary time and an arbitrary position in the measurement target optical fiber among the in-phase and orthogonal components of the scattered light; the vector rotation procedure S03 of rotating the two-dimensional vector acquired through the vector acquisition procedure S02 for each wavelength at a reference time by a reference rotational amount for the wavelength so that the two-dimensional vector becomes aligned with a reference direction, and rotating the two-dimensional vector acquired through the vector acquisition procedure S02 for each wavelength at another time different from the reference time by a reference rotational amount for the wavelength; and the calculation procedure S04 of calculating a synthesis reference vector as the arithmetic average of the two-dimensional vector for each wavelength at the reference time, which is rotated through the vector rotation procedure S03, calculating a synthesis vector as the arithmetic average of the two-dimensional vector for each wavelength at the other time, which is rotated through the vector rotation procedure S03, and calculating the phase change amount of the scattered light based on the angle between the synthesis reference vector and the synthesis vector.

The signal processing unit 17d of the present embodiment performs phase calculation by a method same as the method described in Embodiment 1, thereby preventing increase of the phase uncertainty at a point where the scattered light intensity is small due to fading. However, although the calculation is performed with scattered light of all wavelengths (N wavelengths) multiplexed in a light pulse incident on the measurement target optical fiber 6 in Embodiment 1, p wavelengths are selected from among the N wavelengths and the calculation is performed with scattered light of the selected p wavelengths in the present embodiment.

Specifically, the selection procedure S01a is performed after the measurement procedure S01. The following describes the selection procedure S01a.

[Selection Procedure S01a]

In the selection procedure S01a, a predetermined number p of wavelengths to be used in the phase calculation are selected from among the N wavelengths multiplexed in the light pulse. The predetermined number p may be determined, for example, as follows. It is preferable to determine the predetermined number p before the selection procedure S01a and the measurement procedure S01 because the measurement time of the phase measurement method of the present embodiment can be reduced.

First, D(Pi) described below is measured. D(Pi) represents distribution of an intensity Pi of scattered light of a wavelength i at a time and a position in the measurement target optical fiber 6, and independently obeys an equation below.

[Math. 14]

$$D(Pi) \propto \left[ -\frac{Pi}{<Pi>} \right] \quad (14)$$

where <Pi> represents a statistical average intensity of the scattered light and can be measured in advance by, for example, a portable OTDR configured to measure a light loss.

At acquisition of a scattered light vector (two-dimensional vector) of each wavelength, noise levels NI and NQ generated in an I component and a Q component of the vector can be measured in advance. NI and NQ are substantially equal to each other so that NI=NQ=Noise holds.

To perform simulation described below, a trial number X is set by using the central limit theorem or the like. For example, the size of X is such that it can be regarded that the squared value of a length |r(x, i)| of the scattered light vector of each wavelength i obeys probability distribution of D(Pi) at the x-th (x=1, ..., X) trial. For example, X is equal to or larger than 5000.

The length |r(x, i)| of the scattered light vector is randomly generated by a calculator so that the squared value of the length |r(x, i)| of the scattered light vector of each wavelength i obeys probability distribution of D(Pi) at the x-th (x=1, ..., X) trial.

The lengths |r(x, i)| of the scattered light vector of the wavelengths i are sorted in descending order, and the average value of the longest p' lengths |r(x, i)| is set as |r'(x, p')|. Determination is made based on |r'(x, p')| as follows.

[Math. 15]

$|r'(x, p')| \le \frac{\text{Noise}}{\sqrt{p'}}$: The SN ratio is equal to or smaller than one and phase detection is impossible $|r'(x, p')| > \frac{\text{Noise}}{\sqrt{p'}}$: Phase detection is possible In this case, phase detection sensitivity (detection lower limit) is $$\text{Arcsin}\left( \frac{\text{Noise}}{\sqrt{p'} |r'(x, p')|} \right) \quad (15)$$

A phase detection sensitivity (detection lower limit) of each |r'(x, p')| with which phase detection is possible in the above-described process is calculated, and an average value ε(p') thereof is calculated. The average value ε(p') is compared with an arbitrary reference sensitivity ε, and a minimum p' that satisfies ε≥ε(p') is set as the predetermined number p.

The reference sensitivity ε can be set as follows.
(a) Sensitivity Value as a Statistical Average Needed for Measurement of a Measurement Target Phenomenon A "measurement target phenomenon" is the kind of vibration applied to an optical fiber. Thus, with background knowledge on the kind of vibration to be measured, the reference value E can be set to be a sensitivity as a measurement statistical average. The "background knowledge" may be knowledge on the size and frequency of vibration obtained through theoretical calculation based on a vibration generation mechanism and the like, or knowledge on the size and frequency of vibration, which is empirically obtained based on a preliminary experiment or the like. For example, when large vibration is measured low accuracy, the reference sensitivity ε is set to be large to rise the detection lower limit as a needed measurement statistical average. When small vibration is measured or large vibration is measured at high accuracy, the reference sensitivity ε is set to be small to lower the detection lower limit as a needed measurement statistical average.

(b) Value in Accordance with a Sensitivity $\varepsilon_3$ as a Statistical Average in a Third Phase Measurement Method to be Described Later An uncertainty D(n) is calculated for the above-described |r(x, i)| at each x by Expression C1. The average value of |r(x, i)| up to $n_{min}$-th that minimizes D(n) is set as |r''(x, n (x))|. A sensitivity $\varepsilon_3(x)$ is calculated from |r''(x, n (x))| as follows.

[Math. 16]

$\varepsilon_3(x)$ is calculated as phase detection sensitivity (16)

(detection lower limit) $\text{Arcsin}\left( \frac{\text{Noise}}{\sqrt{n(x)} |r''(x, n(x))|} \right)$ for x when $|r''(x, n(x))| > \frac{\text{Noise}}{\sqrt{n(x)}}$ holds.

The sensitivity $\varepsilon_3$ is obtained by averaging $\varepsilon_3(x)$ over x.
Then, ε is set to a value substantially equal to $\varepsilon_3$. However, $\varepsilon_3 \le \varepsilon(p')$ always holds, and thus ε needs to be set to a value equal to or larger than $\varepsilon_3$. For example, ε is set to be $1.2\varepsilon_3$.

After p is found that through the selection procedure S01a, the vector acquisition procedure S02 described in Embodiment 1 is performed. However, not the two-dimensional vectors of all wavelengths multiplexed in the light pulse but the two-dimensional vectors of the p wavelengths found through the selection procedure S01a are acquired. The vector rotation procedure S03 and the calculation procedure S04 thereafter are same as described in Embodiment 1.

Embodiment 4

Figure 13:
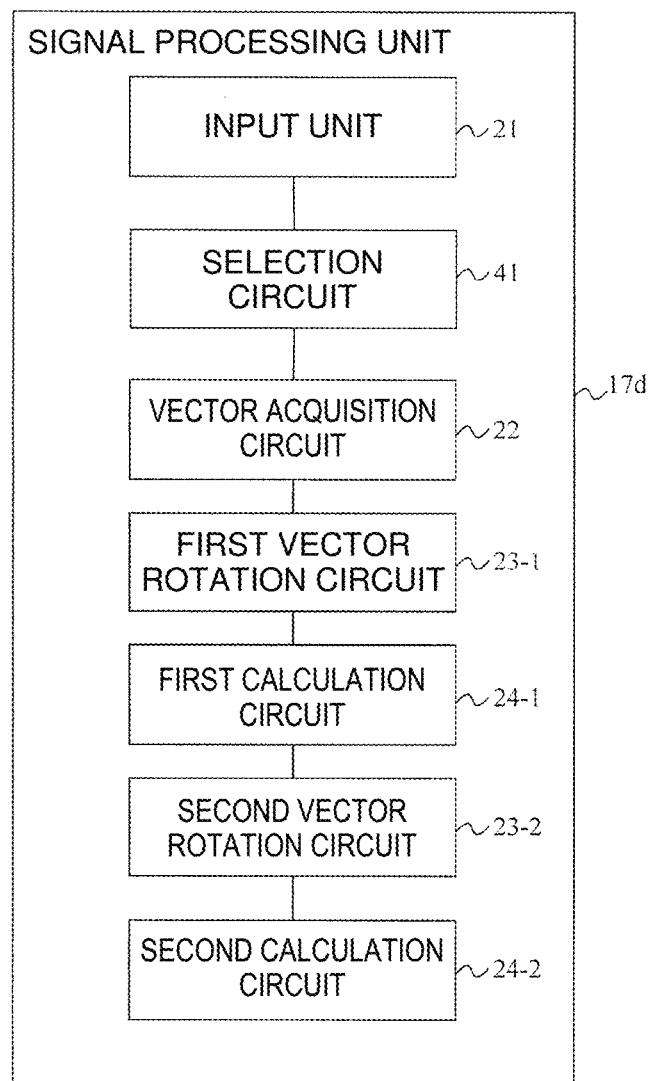
FIG. 13 is a diagram for description of the structure of the signal processing device according to the present invention.

The configuration of a vibration detection device of the present embodiment is same as the configuration of the vibration detection device in FIG. 1. FIG. 13 is a diagram for description of the structure of the signal processing unit 17d of the present embodiment.

The signal processing unit 17d is the second signal processing device and has a configuration in which the selection circuit 41 is disposed between the input unit 21 and the vector acquisition circuit 22 of the signal processing unit 17d (FIG. 9) of Embodiment 2.

Figure 14:
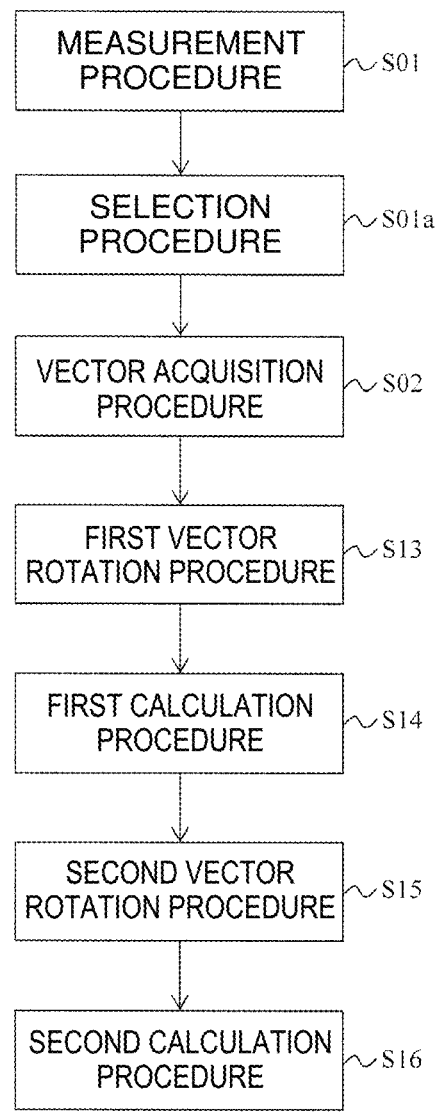
FIG. 14 is a diagram for description of the phase measurement method according to the present invention.

FIG. 14 is a diagram for description of the phase measurement method performed by the present vibration detection device. The phase measurement method is the first phase measurement method and performs the selection procedure S01a after the measurement procedure S01 and before the vector acquisition procedure S02 in the phase measurement method (FIG. 10) of Embodiment 2.

The signal processing unit 17d of the present embodiment performs phase calculation by a method same as the method described in Embodiment 2, thereby preventing increase of the phase uncertainty at a point where the scattered light intensity is small due to fading. However, although the calculation is performed with scattered light of all wavelengths (N wavelengths) multiplexed in a light pulse incident on the measurement target optical fiber 6 in Embodiment 2, p wavelengths are selected from among the N wavelengths and the calculation is performed with scattered light of the selected p wavelengths in the present embodiment. The wavelength selection method is same as the selection procedure S01*a* described in Embodiment 3.

After p is found through the selection procedure S01*a*, the vector acquisition procedure S02 described in Embodiment 2 is performed. However, not the two-dimensional vectors of all wavelengths multiplexed in the light pulse but the two-dimensional vectors of the p wavelengths found through the selection procedure S01*a* are acquired. The subsequent procedures from the first vector rotation procedure S13 to the second calculation procedure S16 are same as described in Embodiment 2.

Embodiment 5

Figure 15:
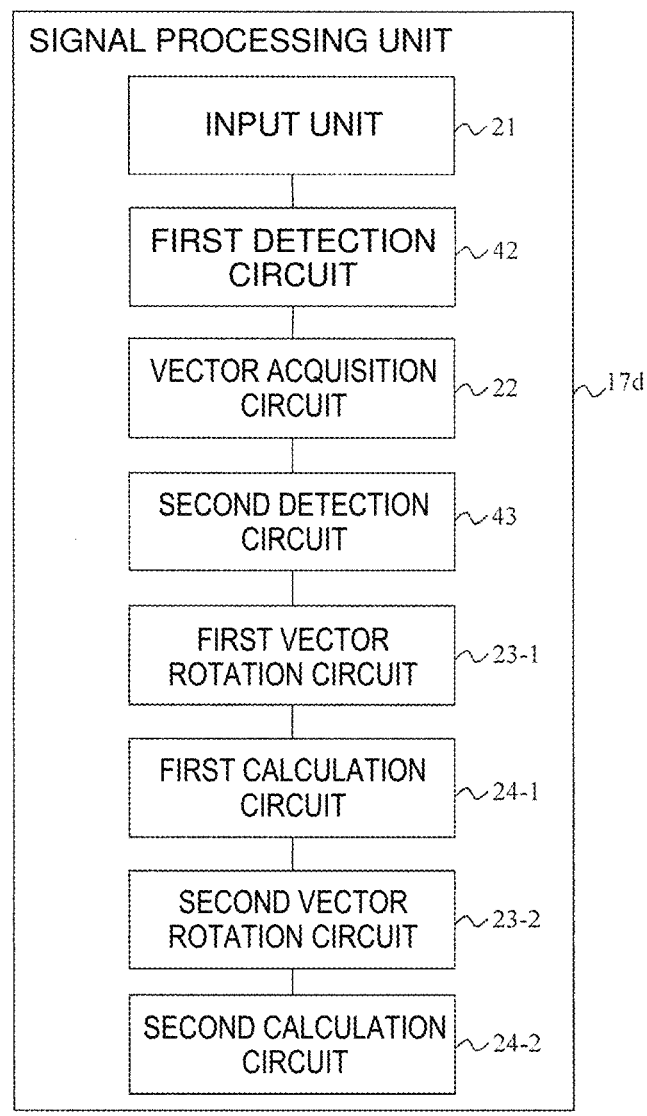
FIG. 15 is a diagram for description of the structure of the signal processing device according to the present invention.

The configuration of a vibration detection device of the present embodiment is same as the configuration of the vibration detection device in FIG. 1. FIG. 15 is a diagram for description of the structure of the signal processing unit 17*d* of the present embodiment.

The signal processing unit 17*d* is the third signal processing device and includes: the input unit 21 to which the in-phase and orthogonal components of scattered light generated at a wavelength-multiplexed light pulse obtained by multiplexing N wavelengths and incident on a measurement target optical fiber are input, the in-phase and orthogonal components being measured by the measuring device 31; a first detection circuit 42 configured to sort rays of the scattered light input to the input unit 21 in descending order of light intensity, the rays corresponding to the respective wavelengths, calculate the uncertainty D(n) of the phase of Expression C1 by using n (n is an integer between 1 and N inclusive) rays of the scattered light having the highest light intensities, and detect n that minimizes the uncertainty D(n) of the phase; the vector acquisition circuit 22 configured to acquire, for each of the N wavelengths detected by the first detection circuit 42, a two-dimensional vector constituted by an in-phase component and an orthogonal component at an arbitrary time and an arbitrary position in the measurement target optical fiber among the in-phase and orthogonal components of the scattered light input to the input unit 21; a second detection circuit 43 configured to calculate a value H of Expression C2 for each of the n wavelengths detected by the first detection circuit 42, sort rays of the scattered light in ascending order of the value H, the rays corresponding to times, calculate an uncertainty Dt(M) of the phase of Expression C3 by using rays of the scattered light having the smallest values H up to an M-th time, and detect M that minimizes the uncertainty Dt(M) of the phase; the first vector rotation circuit 23-1 configured to rotate the two-dimensional vector acquired by the vector acquisition circuit 22 for a reference wavelength at each of M times by a reference rotational amount for the time so that the two-dimensional vector becomes aligned with a reference direction, and rotate the two-dimensional vector acquired by the vector acquisition circuit 22 for another wavelength different from the reference wavelength at each of M times by the reference rotational amount for the time; the first calculation circuit 24-1 configured to calculate the first synthesis reference vector as the arithmetic average of the two-dimensional vector for the reference wavelength at each time, which is rotated by the first vector rotation circuit 23-1, calculate the first synthesis vector for each wavelength as the arithmetic average of the two-dimensional vector for the other wavelength at each time, which is rotated by the first vector rotation circuit 23-1, and calculate a reference rotational amount for each wavelength based on the angle between the first synthesis reference vector and the first synthesis vector; the second vector rotation circuit 23-2 configured to rotate the two-dimensional vector acquired by the vector acquisition circuit 22 for each wavelength at a reference time by the reference rotational amount for the wavelength, which is calculated by the first calculation circuit 24-1, and rotate the two-dimensional vector acquired by the vector acquisition circuit 22 for each wavelength at another time different from the reference time by the reference rotational amount for the wavelength, which is calculated by the first calculation circuit 24-1; and the second calculation circuit 24-2 configured to calculate the second synthesis reference vector as the arithmetic average of the two-dimensional vector for each wavelength at the reference time, which is rotated by the second vector rotation circuit 23-2, calculate the second synthesis vector as the arithmetic average of the two-dimensional vector for each wavelength at the other time, which is rotated by the second vector rotation circuit 23-2, and calculate the phase change amount of the scattered light based on the angle between the second synthesis reference vector and the second synthesis vector.

[Math. C1]

$$D(n) = \text{Arcsin}\left(\frac{\text{Noise}}{\sqrt{n}\,|r(n)|}\right) \tag{C1}$$

where |r(n)| is the average value of the length of a vector constituted by the in-phase and orthogonal components of each of n rays of the scattered light having the highest light intensities among rays of the scattered light input to the input unit and sorted in descending order of light intensity, the rays corresponding to respective wavelengths, and Noise is a noise level of measurement of the scattered light by the measuring device.

[Math. C2]

$$H = \frac{1}{P_k^2} + \frac{1}{P_1^2} \tag{C2}$$

where $P_k$ is the light intensity of the scattered light of a wavelength k, and $P_l$ is the light intensity of the scattered light of a wavelength 1.

[Math. C3]

$$Dt(M) = \text{Arcsin}\left(\frac{\text{Noise}}{\sqrt{M}\,|r(M)|}\right) \tag{C3}$$

where |r(M)| is the average value of the length of a vector constituted by the in-phase and orthogonal components of each of the M rays of the scattered light sorted in ascending order of the value H by the second detection circuit.

Figure 16:
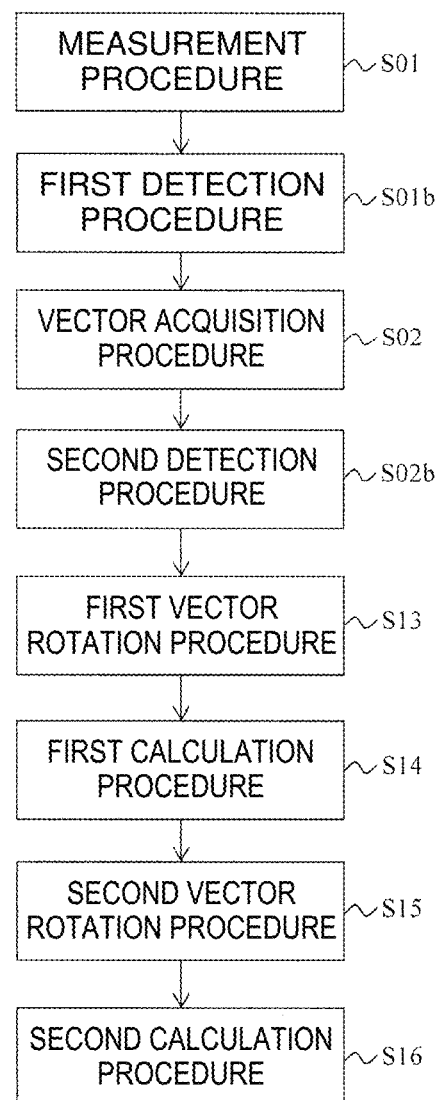
FIG. 16 is a diagram for description of the phase measurement method according to the present invention.

FIG. 16 is a diagram for description of the phase measurement method performed by the present vibration detection device. The phase measurement method is the third phase measurement method and includes the measurement procedure S01 of emitting a light pulse obtained by multiplexing N wavelengths into the measurement target optical fiber 6 and measuring the in-phase and orthogonal components of scattered light generated at the light pulse; a first detection procedure S01$b$ of sorting rays of the scattered light measured through the measurement procedure S01 in descending order of light intensity, the rays corresponding to the respective wavelengths, calculating the uncertainty D(n) of the phase of Expression C1 by using n (n is an integer between 1 and N inclusive) rays of the scattered light having the highest light intensities, and detecting n that minimizes the uncertainty D(n) of the phase; the vector acquisition procedure S02 of acquiring, for each of the n wavelengths detected by the first detection procedure S01$b$, a two-dimensional vector constituted by an in-phase component and an orthogonal component at an arbitrary time and an arbitrary position in the measurement target optical fiber among the in-phase and orthogonal components of the scattered light; a second detection procedure S02$b$ of calculating the value H of Expression C2 for each of the n wavelengths detected through the first detection procedure S01$b$, sorting rays of the scattered light in ascending order of the value H, the rays corresponding to times, calculating an uncertainty Dt(M) of the phase of Expression C3 by using rays of the scattered light having the smallest values H up to an M-th time, and detecting M that minimizes the uncertainty Dt(M) of the phase; the first vector rotation procedure S13 of rotating the two-dimensional vector acquired through the vector acquisition procedure S02 for a reference wavelength at each of M times by a reference rotational amount for the time so that the two-dimensional vector becomes aligned with a reference direction, and rotating the two-dimensional vector acquired through the vector acquisition procedure for another wavelength different from the reference wavelength at each of M times by the reference rotational amount for the time; the first calculation procedure S14 of calculating the first synthesis reference vector as the arithmetic average of the two-dimensional vector for the reference wavelength at each time, which is rotated through the first vector rotation procedure S13, calculating the first synthesis vector for each wavelength as the arithmetic average of the two-dimensional vector for the other wavelength at each time, which is rotated through the first vector rotation procedure S13, and calculating a reference rotational amount for each wavelength based on the angle between the first synthesis reference vector and the first synthesis vector; the second vector rotation procedure S15 of rotating the two-dimensional vector acquired through the vector acquisition procedure S02 for each wavelength at a reference time by the reference rotational amount for the wavelength, which is calculated through the first calculation procedure S14, and rotating the two-dimensional vector acquired through the vector acquisition procedure S02 for each wavelength at another time different from the reference time by the reference rotational amount for the wavelength, which is calculated through the first calculation procedure S14; and the second calculation procedure S16 of calculating the second synthesis reference vector as the arithmetic average of the two-dimensional vector for each wavelength at the reference time, which is rotated through the second vector rotation procedure S15, calculating the second synthesis vector as the arithmetic average of the two-dimensional vector for each wavelength at the other time, which is rotated through the second vector rotation procedure S15, and calculating the phase change amount of the scattered light based on the angle between the second synthesis reference vector and the second synthesis vector.

The signal processing unit 17$d$ of the present embodiment performs phase calculation by a method same as the method described in Embodiment 2, thereby preventing increase of the phase uncertainty at a point where the scattered light intensity is small due to fading. However, although the calculation is performed with scattered light of all wavelengths (N wavelengths) multiplexed in a light pulse incident on the measurement target optical fiber 6 in Embodiment 2, n wavelengths are selected from among N wavelengths and the calculation is performed with scattered light of the selected n wavelengths in the present embodiment.

Specifically, the first detection procedure S01$b$ is performed after the measurement procedure S01. The following describes the first detection procedure S01$b$.

[First Detection Procedure S01$b$]

Figure 17:
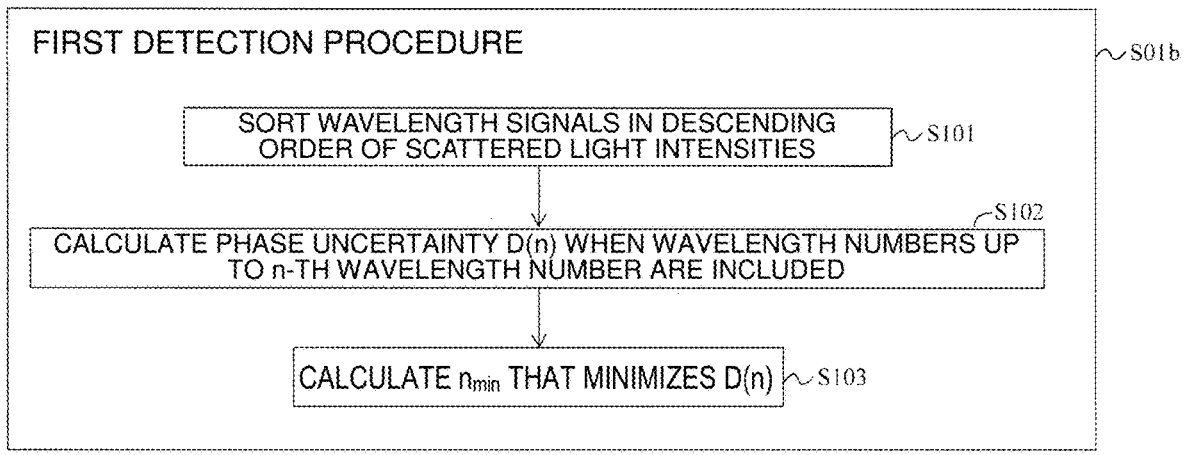
FIG. 17 is a diagram for description of a first detection procedure of the phase measurement method according to the present invention.

FIG. 17 illustrates details of the first detection procedure S01$b$. In the first detection procedure S01$b$, first, rays of scattered light for wavelengths are sorted in descending order of light intensity (step S101). Then, the phase uncertainty D(n) when the phase calculation is performed by using (n=1) to n-th rays of the scattered light having the high light intensities is calculated by Expression C1. The calculation is performed up to the scattered light of a wavelength that minimizes the light intensity of the scattered light (step S102). As a result, n (this n is set as $n_{min}$) that minimizes D(n) is found (step S103).

[Vector Acquisition Procedure S02]

Although the two-dimensional vectors of the scattered light of N wavelengths are acquired in Embodiment 2, the two-dimensional vectors of the scattered light of $n_{min}$ wavelengths are acquired in the present embodiment.

[Second Detection Procedure S02$b$]

Figure 18:
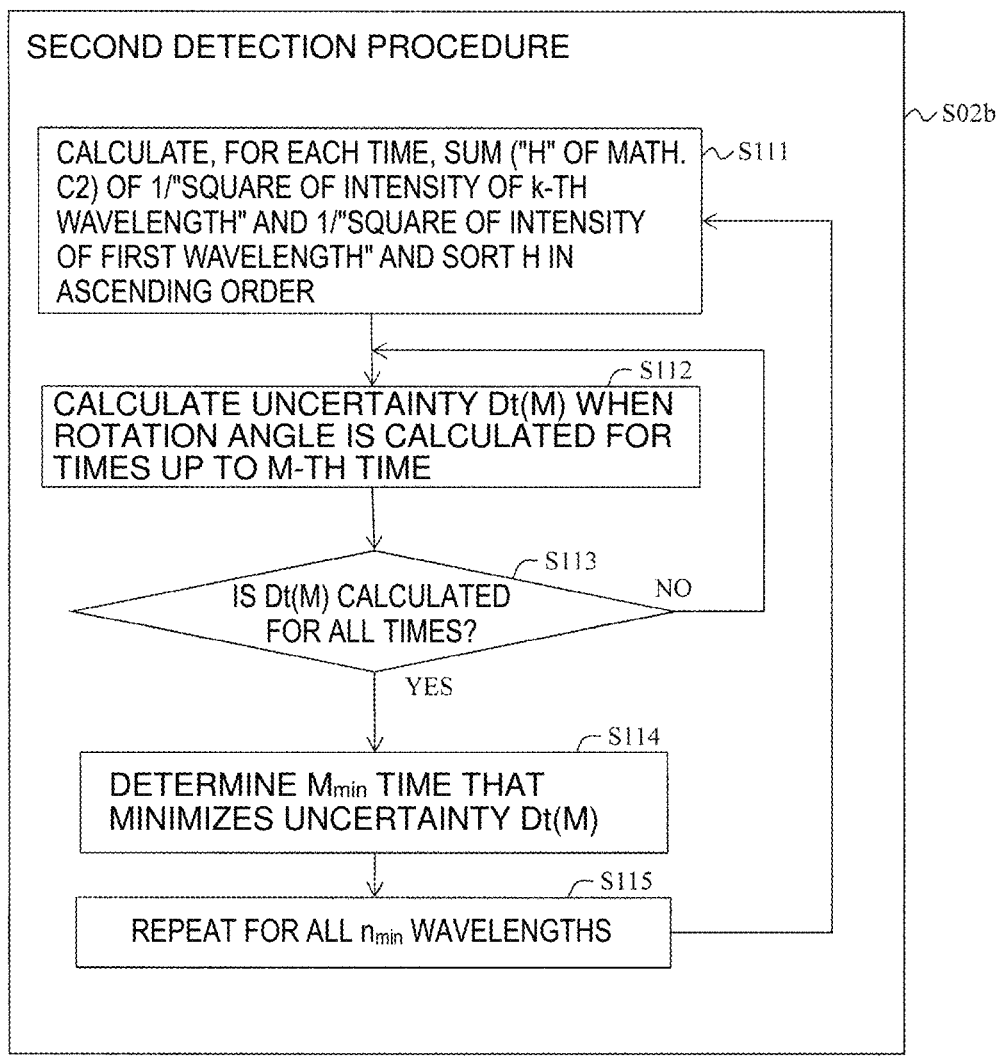
FIG. 18 is a diagram for description of a second detection procedure of the phase measurement method according to the present invention.

FIG. 18 illustrates details of the second detection procedure S02$b$. In the present embodiment, the rotation angle is calculated for each of the two-dimensional vectors of the scattered light of the $n_{min}$ wavelengths, and this calculation has characteristics. First, the value H of Expression C2 is calculated for the k-th (k is an integer equal to or larger than two and equal to or smaller than $n_{min}$) wavelength. This value H is calculated for each time. Then, the values H for the times are sorted in ascending order (step S111). In addition, an uncertainty Dt(M) when the rotation angle is calculated with the rays of the scattered light for the time of the minimum H to the time of the M-th (M is an integer equal to or larger than one) H is calculated by Expression C3 (step S112). The calculation is performed up to the ray of the scattered light at the time of the maximum H (step S113). As a result, M (this M is set as $M_{min}$) that minimizes Dt(M) is found (step S114). This calculation is performed for all $n_{min}$ wavelengths (step S115).

[First Vector Rotation Procedure S13]

After $M_{min}$ is found through the second detection procedure S02$b$, the first vector rotation procedure S13 described in Embodiment 2 is performed. Specifically, any one of the $n_{min}$ wavelengths is set as a reference wavelength, and the two-dimensional vectors of the $M_{min}$ times are rotated with respect to the reference wavelength, so that the two-dimensional vectors become aligned with the I axis (the rotational amounts are represented by $\theta_{i=1, M}$; M is 1 to $M_{min}$). For the other wavelengths other than the reference wavelength, the two-dimensional vectors of the $M_{min}$ times are rotated by $\theta_{i=1, M}$.

After the first vector rotation procedure S13, the first calculation procedure S14, the second vector rotation procedure S15, and the second calculation procedure S16, which are described in Embodiment 2, are performed for the two-dimensional vectors of the scattered light of the $n_{min}$ wavelengths.

Embodiment 6

A large calculation amount and a long time are needed when the phase calculation is performed by the phase measurement method of Embodiment 5 for all times and all places of the measurement target optical fiber. Thus, it is preferable to perform the phase measurement method of Embodiment 3 or 4 for all times and all places in the measurement target optical fiber beforehand, determine, based on a result of the method, a time and a place at which a phase with a small uncertainty is desired to be calculated, and perform the phase measurement method of Embodiment 5 for the time and the place. Specifically, the phase measurement method of FIG. 12 or FIG. 14 is performed as the first stage, followed by a process of selecting, based on a result of the method, a time and a place at which a phase with a further reduced uncertainty is desired to be calculated, and then the first detection procedure S01b and later in the phase measurement method of FIG. 16 are performed as the second stage. When the phase calculation is performed by this method, the calculation time can be reduced as compared to a case in which the phase calculation is performed by the phase measurement method of Embodiment 5 from the start. When the phase calculation is performed at a desired accuracy at the first stage, the second stage does not need to be performed, which leads to further reduction of the calculation time.

In the case of the present embodiment, failure sometimes occurs as follows.

In the phase measurement method of FIG. 16, the phase calculation is performed only at a specific time T and a specific place A in the measurement target optical fiber as described above. In this case, the rotation angle of the first vector rotation procedure S13, which is obtained as a result of the second detection procedure S01b of FIG. 17 is applied only to the specific place A and the specific time T. This rotation angle is different from the rotation angles of the first vector rotation procedure S13 in FIGS. 12 and 14. Thus, at the specific place A, the rotation angle (the specific time T) of the first vector rotation procedure S13 in FIG. 16 is different from the rotation angles (other than the specific time T) of the first vector rotation procedure S13 in FIGS. 12 and 14. This difference can be a factor of distortion of phase transition at the specific place A. When this influence is large, the phase calculation may be performed at all times and the specific place A in the measurement target optical fiber in the phase measurement method of FIG. 16.

The present invention is not limited to the above-described embodiments but may be materialized by components modified without departing from the scope thereof when performed.

[Notes]

The signal processing method of the present embodiment is described below.

(1): In a device configuration that includes a phase OTDR device configured to measure the phase of scattered light scattered from a measurement target optical fiber and in which incident light in the device is wavelength-multiplexed, the present signal processing method produces a scattered light vector obtained by plotting scattered light at each wavelength onto a two-dimensional plane having the in-phase component thereof as the horizontal axis and the orthogonal component thereof as the vertical axis, rotates the produced scattered light vector for each wavelength at each place in the measurement target optical fiber to align the directions of the vectors, calculates the arithmetic average of the vectors having the aligned directions to generate a new vector, and calculates a phase by using the values of the in-phase component and the orthogonal component of the generated new vector, thereby performing highly sensitive phase measurement.

(2): In the procedure of rotating, for each wavelength, the scattered light vector at each place in the measurement target optical fiber, the signal processing method described above in (1) calculates the rotational amount for each wavelength based on a vector generated by rotating the scattered light vector at each place and each time to align the directions of the vectors and calculating the arithmetic average of the vectors having the aligned directions.

(3): A measurement device that uses the above-described signal processing method includes a laser beam source configured to output continuous light, an element configured to bifurcate the continuous light from the laser beam source into reference light and probe light, an element configured to multiplex the frequency of the probe light, an element configured to cause the probe light to be incident on a measurement target optical fiber, and an element configured to receive backscattered light of the probe light from the measurement target optical fiber and the reference light and output the in-phase and orthogonal components of the backscattered light, and performs the above-described signal processing method by using the output in-phase and orthogonal components.

INDUSTRIAL APPLICABILITY

The present invention is applicable to a vibration detection device that employs DAS-P. The vibration detection device can accurately measure vibration and thus can accurately perform structure state recognition in structure sensing, intrusion determination in intruder sensing, and the like.

REFERENCE SIGNS LIST 1 light source
2 coupler
3 light modulator
4 light pulse
4a minute pulse
5 circulator
6 measurement target optical fiber
7 90-degree optical hybrid
8, 9 coupler
10 phase shifter
11, 12 coupler
13, 14 balance detector
15 analog in-phase component electric signal
16 analog orthogonal component electric signal
17 signal processing device
17a, 17b AD conversion element
17c, 17d signal processing unit
21 input unit
22 vector acquisition circuit
23 vector rotation circuit
24 calculation circuit
23-1 first vector rotation circuit
23-2 second vector rotation circuit
24-1 first calculation circuit
24-2 second calculation circuit
31 measuring device 41 selection circuit
42 first detection circuit
43 second detection circuit

The invention claimed is:

1. A phase measurement method comprising:
generating and directing, by a measurement device, a stream of light pulses into a measurement target optical fiber, where the stream of light pulses having N wavelengths multiplexed together therein and N is an integer equal to or larger than two;
measuring, by the measurement device, an in-phase component and an orthogonal component of scattered light from the measurement target optical fiber;
a selection procedure of sorting rays of the scattered light measured through the measurement procedure in descending order of light intensity, the rays corresponding to the respective wavelengths, and selecting a predetermined number p (p is an integer between 1 and N inclusive) of rays of the scattered light having the highest light intensities;
a vector acquisition procedure of acquiring, for each of the p wavelengths selected through the selection procedure, a two-dimensional vector constituted by an in-phase component and an orthogonal component at an arbitrary time and an arbitrary position in the measurement target optical fiber among the in-phase and orthogonal components of the scattered light;
a vector rotation procedure of rotating the two-dimensional vector acquired through the vector acquisition procedure for each wavelength at a reference time by a reference rotational amount for the wavelength so that the two-dimensional vector becomes aligned with a reference direction, and rotating the two-dimensional vector acquired through the vector acquisition procedure for each wavelength at other time different from the reference time by a reference rotational amount for the wavelength;
a calculation procedure of calculating a synthesis reference vector as an arithmetic average of the two-dimensional vector for each wavelength at the reference time, which is rotated through the vector rotation procedure, calculating a synthesis vector as an arithmetic average of the two-dimensional vector for each wavelength at the other time, which is rotated through the vector rotation procedure, and calculating a phase change amount of the scattered light based on an angle between the synthesis reference vector and the synthesis vector; and
outputting the phase change amount of the scattered light as the vibration of the measurement target fiber.

2. The phase measurement method according to claim 1, further comprising:
measuring distribution D (Pi) of intensity Pi of the scattered light of a wavelength i at an arbitrary time and an arbitrary position in the measurement target optical fiber, and a noise level Noise at acquisition of the two-dimensional vector constituted by an in-phase component and an orthogonal component of the scattered light;
randomly generating, by a calculator, X (X is an arbitrary positive integer) lengths |r(x, i)| (x=1, ..., X) of the two-dimensional vector of the scattered light of the wavelength i so that a squared value of each length |r(x, i)| obeys the distribution D (Pi);
sorting the lengths |r(x, i)| in descending order, calculating an average value |r' (x, p')| of the longest p' lengths |r(x, i)|;

calculating a phase detection sensitivity of each average value |r' (x, p') | that satisfies Expression B1 by using Expression B2;
comparing an average value ε(p') of the phase detection sensitivities with an arbitrary reference sensitivity ε; and
setting the predetermined number p to be a minimum p' that satisfies ε≥ε(p')

[Math. B1]

$$|r'(x, p')| > \frac{\text{Noise}}{\sqrt{p'}} \quad (B1)$$

[Math. B2]

$$\text{Arcsin}\left(\frac{\text{Noise}}{\sqrt{p'}\,|r'(x, p')|}\right). \quad (B2)$$

3. A phase measurement method comprising:
generating and directing, by a measurement device, a stream of light pulses into a measurement target optical fiber, where the stream of light pulses having N wavelengths multiplexed together therein and N is an integer equal to or larger than two;
measuring, by the measurement device, an in-phase component and an orthogonal component of scattered light from the measurement target optical fiber;
a selection procedure of sorting rays of the scattered light measured through the measurement procedure in descending order of light intensity, the rays corresponding to the respective wavelengths, and selecting a predetermined number p (p is an integer between 1 and N inclusive) of rays of the scattered light having the highest light intensities;
a vector acquisition procedure of acquiring, for each of the p wavelengths selected through the selection procedure, a two-dimensional vector constituted by an in-phase component and an orthogonal component at an arbitrary time and an arbitrary position in the measurement target optical fiber among the in-phase and orthogonal components of the scattered light;
a first vector rotation procedure of rotating the two-dimensional vector acquired through the vector acquisition procedure for a reference wavelength at each time by a reference rotational amount for the time so that the two-dimensional vector becomes aligned with a reference direction, and rotating the two-dimensional vector acquired through the vector acquisition procedure for other wavelength different from the reference wavelength at each time by the reference rotational amount for the time;
a first calculation procedure of calculating a first synthesis reference vector as an arithmetic average of the two-dimensional vector for the reference wavelength at each time, which is rotated through the first vector rotation procedure, calculating a first synthesis vector for each wavelength as an arithmetic average of the two-dimensional vector for the other wavelength at each time, which is rotated through the first vector rotation procedure, and calculating a reference rotational amount for each wavelength based on an angle between the first synthesis reference vector and the first synthesis vector;
a second vector rotation procedure of rotating the two-dimensional vector acquired through the vector acquisition procedure for each wavelength at a reference time by the reference rotational amount for the wavelength, which is calculated through the first calculation procedure, and rotating the two-dimensional vector acquired through the vector acquisition procedure for each wavelength at other time different from the reference time by the reference rotational amount for the wavelength, which is calculated through the first calculation procedure;

a second calculation procedure of calculating a second synthesis reference vector as an arithmetic average of the two-dimensional vector for each wavelength at the reference time, which is rotated through the second vector rotation procedure, calculating a second synthesis vector as an arithmetic average of the two-dimensional vector for each wavelength at the other time, which is rotated through the second vector rotation procedure, and calculating a phase change amount of the scattered light based on an angle between the second synthesis reference vector and the second synthesis vector; and outputting the phase change amount of the scattered light as the vibration of the measurement target fiber.

4. A phase measurement method comprising:

generating and directing, by a measurement device, a stream of light pulses into a measurement target optical fiber, where the stream of light pulses having N wavelengths multiplexed together therein and N is an integer equal to or larger than two;

measuring, by the measurement device, an in-phase component and an orthogonal component of scattered light from the measurement target optical fiber;

a first detection procedure of sorting rays of the scattered light measured through the measurement procedure in descending order of light intensity, the rays corresponding to the respective wavelengths, calculating an uncertainty D(n) of a phase of Expression C1 by using n (n is an integer between 1 and N inclusive) rays of the scattered light having the highest light intensities, and detecting n that minimizes the uncertainty D(n) of the phase;

a vector acquisition procedure of acquiring, for each of the n wavelengths detected through the first detection procedure, a two-dimensional vector constituted by an in-phase component and an orthogonal component at an arbitrary time and an arbitrary position in the measurement target optical fiber among the in-phase and orthogonal components of the scattered light;

a second detection procedure of calculating a value H of Expression C2 for each of the n wavelengths detected through the first detection procedure, sorting rays of the scattered light in ascending order of the value H, the rays corresponding to times, calculating an uncertainty Dt(M) of a phase of Expression C3 by using rays of the scattered light having the smallest values H up to an M-th time, and detecting M that minimizes the uncertainty Dt(M) of the phase;

a first vector rotation procedure of rotating the two-dimensional vector acquired through the vector acquisition procedure for a reference wavelength at each of M times by a reference rotational amount for the time so that the two-dimensional vector becomes aligned with a reference direction, and rotating the two-dimensional vector acquired through the vector acquisition procedure for other wavelength different from the reference wavelength at each of M times by the reference rotational amount for the time;

a first calculation procedure of calculating a first synthesis reference vector as an arithmetic average of the two-dimensional vector for the reference wavelength at each time, which is rotated through the first vector rotation procedure, calculating a first synthesis vector for each wavelength as an arithmetic average of the two-dimensional vector for the other wavelength at each time, which is rotated through the first vector rotation procedure, and calculating a reference rotational amount for each wavelength based on an angle between the first synthesis reference vector and the first synthesis vector;

a second vector rotation procedure of rotating the two-dimensional vector acquired through the vector acquisition procedure for each wavelength at a reference time by the reference rotational amount for the wavelength, which is calculated through the first calculation procedure, and rotating the two-dimensional vector acquired through the vector acquisition procedure for each wavelength at other time different from the reference time by the reference rotational amount for the wavelength, which is calculated through the first calculation procedure;

a second calculation procedure of calculating a second synthesis reference vector as an arithmetic average of the two-dimensional vector for each wavelength at the reference time, which is rotated through the second vector rotation procedure, calculating a second synthesis vector as an arithmetic average of the two-dimensional vector for each wavelength at the other time, which is rotated through the second vector rotation procedure, and calculating a phase change amount of the scattered light based on an angle between the second synthesis reference vector and the second synthesis vector; and outputting the phase change amount of the scattered light as the vibration of the measurement target fiber

[Math. C1]

$$D(n) = \text{Arcsin}\left(\frac{\text{Noise}}{\sqrt{n}\,|r(n)|}\right) \tag{C1}$$

where |r(n)| is an average value of a length of a vector constituted by the in-phase and orthogonal components of each of n rays of the scattered light having highest light intensities among rays of the scattered light measured through the measurement procedure and sorted in descending order of light intensity, the rays corresponding to the respective wavelengths, and Noise is a noise level of measurement of the scattered light in the measurement procedure

[Math. C2]

$$H = \frac{1}{P_k^2} + \frac{1}{P_l^2} \tag{C2}$$

where $P_k$ is a light intensity of the scattered light of a wavelength k, and $P_l$ is a light intensity of the scattered light of a wavelength 1

[Math. C3]

$$Dt(M) = \text{Arcsin}\left(\frac{\text{Noise}}{\sqrt{M}\,|r(M)|}\right) \quad (C3)$$

where |r(M)| is an average value of a length of a vector constituted by the in-phase and orthogonal components of each of the M rays of the scattered light sorted in ascending order of the value H in the second detection procedure.

5. A vibration device which detects vibration of a measurement target fiber in distributed acoustic sensing phase, comprising:

a measuring device; and a signal processing device, the measuring device causes a stream of light pulses to be incident on the measurement target optical fiber, where the stream of light pulses having N wavelengths multiplexed together therein and N is an integer equal to or larger than two, and measures an in-phase component and an orthogonal component of scattered light from the measurement target optical fiber;

the signal processing device consists of an input unit configured to receive the in-phase component and the orthogonal component of scattered light from the measurement target optical fiber;

a selection circuit sorts rays of the scattered light input to the input unit in descending order of light intensity, the rays corresponding to respective wavelengths, and selects a predetermined number p (p is an integer between 1 and N inclusive) of rays of the scattered light having the highest light intensities;

a vector acquisition circuit acquires, for each of the p wavelengths selected by the selection circuit, a two-dimensional vector constituted by an in-phase component and an orthogonal component at an arbitrary time and an arbitrary position in the measurement target optical fiber among the in-phase and orthogonal components of the scattered light input to the input unit;

a vector rotation circuit rotates the two-dimensional vector acquired by the vector acquisition circuit for each wavelength at a reference time by a reference rotational amount for the wavelength so that the two-dimensional vector becomes aligned with a reference direction, and rotates the two-dimensional vector acquired by the vector acquisition circuit for each wavelength at other time different from the reference time by a reference rotational amount for the wavelength a calculation circuit calculates a synthesis reference vector as an arithmetic average of the two-dimensional vector for each wavelength at the reference time, which is rotated by the vector rotation circuit, calculates a synthesis vector as an arithmetic average of the two-dimensional vector for each wavelength at the other time, which is rotated by the vector rotation circuit, and calculates a phase change amount of the scattered light based on an angle between the synthesis reference vector and the synthesis vector; and an output unit configured to output the phase change amount of the scattered light as the vibration of the measurement target fiber.

6. A vibration device which detects vibration of a measurement target fiber in distributed acoustic sensing phase, comprising:

a measuring device; and a signal processing device, the measuring device causes a stream of light pulses to be incident on the measurement target optical fiber, where the stream of light pulses having N wavelengths multiplexed together therein and N is an integer equal to or larger than two, and measures an in-phase component and an orthogonal component of scattered light from the measurement target optical fiber;

the signal processing device consists of an input unit configured to receive the in-phase component and the orthogonal component of scattered light from the measurement target optical fiber;

a selection circuit sorts rays of the scattered light input to the input unit in descending order of light intensity, the rays corresponding to respective wavelengths, and selects a predetermined number p (p is an integer between 1 and N inclusive) of rays of the scattered light having the highest light intensities;

a vector acquisition circuit acquires, for each of the p wavelengths selected by the selection circuit, a two-dimensional vector constituted by an in-phase component and an orthogonal component at an arbitrary time and an arbitrary position in the measurement target optical fiber among the in-phase and orthogonal components of the scattered light input to the input unit;

a first vector rotation circuit rotates the two-dimensional vector acquired by the vector acquisition circuit for a reference wavelength at each time by a reference rotational amount for the time so that the two-dimensional vector becomes aligned with a reference direction, and rotates the two-dimensional vector acquired by the vector acquisition circuit for other wavelength different from the reference wavelength at each time by the reference rotational amount for the time;

a first calculation circuit calculates a first synthesis reference vector as an arithmetic average of the two-dimensional vector for the reference wavelength at each time, which is rotated by the first vector rotation circuit, calculates a first synthesis vector for each wavelength as an arithmetic average of the two-dimensional vector for the other wavelength at each time, which is rotated by the first vector rotation circuit, and calculates a reference rotational amount for each wavelength based on an angle between the first synthesis reference vector and the first synthesis vector;

a second vector rotation circuit rotates the two-dimensional vector acquired by the vector acquisition circuit for each wavelength at a reference time by a reference rotational amount for the wavelength, which is calculated by the first calculation circuit, and rotates the two-dimensional vector acquired by the vector acquisition circuit for each wavelength at other time different from the reference time by a reference rotational amount for the wavelength, which is calculated by the first calculation circuit;

a second calculation circuit calculates a second synthesis reference vector as an arithmetic average of the two-dimensional vector for each wavelength at the reference time, which is rotated by the second vector rotation circuit, calculates a second synthesis vector as an arithmetic average of the two-dimensional vector for each wavelength at the other time, which is rotated by the second vector rotation circuit, and calculates a phase change amount of the scattered light based on an angle between the second synthesis reference vector and the second synthesis vector; and an output unit configured to output the phase change amount of the scattered light as the vibration of the measurement target fiber.

7. The signal processing device according to claim 6, further comprising a preprocessing circuit
   measures distribution D (Pi) of intensity Pi of the scattered light of a wavelength i at an arbitrary time and an arbitrary position in the measurement target optical fiber, and a noise level Noise of measurement of the scattered light by the measuring device;
   randomly generates, by a calculator, X (X is an arbitrary positive integer) lengths |r(x, i)| (x=1, . . . , X) of the two-dimensional vector of the scattered light of the wavelength i so that a squared value of each length |r(x, i)| obeys the distribution D (Pi);
   sorts the lengths |r(x, i)| in descending order;
   calculates an average value |r' (x, p')| of the longest p' lengths |r(x, i)|;
   calculates a phase detection sensitivity of each average value |r'(x, p')| that satisfies Expression B1 by using Expression B2;
   compares an average value ε(p') of the phase detection sensitivities with an arbitrary reference sensitivity ε; and
   sets the predetermined number p to be a minimum p' that satisfies ε≥ε(p')

[Math. B1]
$$|r'(x, p')| > \frac{\text{Noise}}{\sqrt{p'}} \quad (B1)$$

[Math. B2]
$$\text{Arcsin}\left(\frac{\text{Noise}}{\sqrt{p'}\,|r'(x, p')|}\right). \quad (B2)$$

8. A vibration device which detects vibration of a measurement target fiber in distributed acoustic sensing phase, comprising:
   a measuring device; and a signal processing device,
   the measuring device causes a stream of light pulses to be incident on the measurement target optical fiber, where the stream of light pulses having N wavelengths multiplexed together therein and N is an integer equal to or larger than two, and measures an in-phase component and an orthogonal component of scattered light from the measurement target optical fiber;
   the signal processing device consists of
   an input unit configured to receive the in-phase component and the orthogonal component of scattered light from the measurement target optical fiber;
   a first detection circuit sorts rays of the scattered light input to the input unit in descending order of light intensity, the rays corresponding to respective wavelengths, calculate an uncertainty D(n) of a phase of Expression C1 by using n (n is an integer between 1 and N inclusive) rays of the scattered light having the highest light intensities, and detect n that minimizes the uncertainty D(n) of the phase;
   a vector acquisition circuit acquires, for each of the n wavelengths detected by the first detection circuit, a two-dimensional vector constituted by an in-phase component and an orthogonal component at an arbitrary time and an arbitrary position in the measurement target optical fiber among the in-phase and orthogonal components of the scattered light input to the input unit;
   a second detection circuit calculates a value H of Expression C2 for each of the n wavelengths detected by the first detection circuit, sorts rays of the scattered light in ascending order of the value H, the rays corresponding to times, calculates an uncertainty Dt(M) of a phase of Expression C3 by using rays of the scattered light having the smallest values H up to an M-th time, and detects M that minimizes the uncertainty Dt(M) of the phase;
   a first vector rotation circuit rotates the two-dimensional vector acquired by the vector acquisition circuit for a reference wavelength at each of M times by a reference rotational amount for the time so that the two-dimensional vector becomes aligned with a reference direction, and rotates the two-dimensional vector acquired by the vector acquisition circuit for other wavelength different from the reference wavelength at each of M times by the reference rotational amount for the time;
   a first calculation circuit calculates a first synthesis reference vector as an arithmetic average of the two-dimensional vector for the reference wavelength at each time, which is rotated by the first vector rotation circuit, calculates a first synthesis vector for each wavelength as an arithmetic average of the two-dimensional vector for the other wavelength at each time, which is rotated by the first vector rotation circuit, and calculates a reference rotational amount for each wavelength based on an angle between the first synthesis reference vector and the first synthesis vector;
   a second vector rotation circuit rotates the two-dimensional vector acquired by the vector acquisition circuit for each wavelength at a reference time by a reference rotational amount for the wavelength, which is calculated by the first calculation circuit, and rotates the two-dimensional vector acquired by the vector acquisition circuit for each wavelength at other time different from the reference time by the reference rotational amount for the wavelength, which is calculated by the first calculation circuit;
   a second calculation circuit calculates a second synthesis reference vector as an arithmetic average of the two-dimensional vector for each wavelength at the reference time, which is rotated by the second vector rotation circuit, calculates a second synthesis vector as an arithmetic average of the two-dimensional vector for each wavelength at the other time, which is rotated by the second vector rotation circuit, and calculates a phase change amount of the scattered light based on an angle between the second synthesis reference vector and the second synthesis vector; and
   an output unit configured to output the phase change amount of the scattered light as the vibration of the measurement target fiber

[Math. C1]
$$D(n) = \text{Arcsin}\left(\frac{\text{Noise}}{\sqrt{n}\,|r(n)|}\right) \quad (C1)$$

where |r(n)| is an average value of a length of a vector constituted by the in-phase and orthogonal components of each of n rays of the scattered light having highest light intensities among rays of the scattered light input to the input unit and sorted in descending order of light intensity, the rays corresponding to respective wavelengths, and Noise is a noise level of measurement of the scattered light by the measuring device

[Math. C2]

$$H = \frac{1}{P_k^2} + \frac{1}{P_l^2} \quad (C2)$$

where $P_k$ is a light intensity of the scattered light of a wavelength k, and $P_l$ is a light intensity of the scattered light of a wavelength l

[Math. C3]

$$Dt(M) = \mathrm{Arcsin}\left(\frac{\mathrm{Noise}}{\sqrt{M}\,|r(M)|}\right) \quad (C3)$$

where $|r(M)|$ is an average value of a length of a vector constituted by the in-phase and orthogonal components of each of the M rays of the scattered light sorted in ascending order of the value H by the second detection circuit.

\* \* \* \* \*